(12) United States Patent
Lee et al.

(10) Patent No.: US 9,173,211 B2
(45) Date of Patent: *Oct. 27, 2015

(54) METHOD AND APPARATUS FOR TRANSMITTING UPLINK CONTROL INFORMATION

(71) Applicant: LG ELECTRONICS INC., Seoul (KR)

(72) Inventors: Moon Il Lee, Anyang-si (KR); Jae Hoon Chung, Anyang-si (KR); Hyun Soo Ko, Anyang-si (KR); Bin Chul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,610

(22) Filed: Feb. 11, 2014

(65) Prior Publication Data

US 2014/0161067 A1     Jun. 12, 2014

Related U.S. Application Data

(63) Continuation of application No. 12/839,969, filed on Jul. 20, 2010, now Pat. No. 8,774,224.

(60) Provisional application No. 61/227,050, filed on Jul. 20, 2009.

(30) Foreign Application Priority Data

Jul. 16, 2010   (KR) .................. 10-2010-0069043

(51) Int. Cl.
*H04J 1/00* (2006.01)
*H04W 72/04* (2009.01)
(Continued)

(52) U.S. Cl.
CPC ......... *H04W 72/0413* (2013.01); *H04L 5/0023* (2013.01); *H04L 5/0055* (2013.01);
(Continued)

(58) Field of Classification Search
USPC .................. 370/310–350, 436, 441, 479, 480
See application file for complete search history.

(56) References Cited

U.S. PATENT DOCUMENTS

| 2007/0189151 A1 | 8/2007 | Pan et al. |
| 2008/0153425 A1 | 6/2008 | Heo et al. |

(Continued)

FOREIGN PATENT DOCUMENTS

| CN | 101272370 | 9/2008 |
| WO | 2009/023863 | 2/2009 |

OTHER PUBLICATIONS

The State Intellectual Property Office of the People's Republic of China Application Serial No. 201080033133.9, Office Action dated Jan. 2, 2014, 8 pages.

(Continued)

*Primary Examiner* — Ricky Ngo
*Assistant Examiner* — Wei-Po Kao
(74) *Attorney, Agent, or Firm* — Lee, Hong, Degerman, Kang & Waimey

(57) ABSTRACT

A method of transmitting uplink control information of a user equipment is provided. The method includes: generating the uplink control information repeatedly as many as uplink data transmission layers; modulating the uplink control information to generate a plurality of repeated modulation symbol; applying a precoding matrix to the plurality of repeated modulation symbols to generate a plurality of first precoded symbol; and transmitting the plurality of first precoded symbols respectively through a plurality of antennas in an uplink subframe comprising a plurality of single carrier frequency division multiple access (SC-FDMA) symbols in a time domain and a plurality of subcarriers in a frequency domain.

10 Claims, 26 Drawing Sheets

(51) Int. Cl.
  *H04L 5/00* (2006.01)
  *H04W 52/14* (2009.01)
  *H04W 52/58* (2009.01)
  *H04W 52/60* (2009.01)
  *H04L 25/03* (2006.01)

(52) U.S. Cl.
  CPC ............ *H04W52/146* (2013.01); *H04W 52/58* (2013.01); *H04W 52/60* (2013.01); *H04L 5/006* (2013.01); *H04L 5/0051* (2013.01); *H04L 25/03343* (2013.01); *H04L 2025/03414* (2013.01); *H04L 2025/03426* (2013.01)

(56) References Cited

U.S. PATENT DOCUMENTS

| | | | |
|---|---|---|---|
| 2008/0186916 A1* | 8/2008 | Oshiba et al. | 370/330 |
| 2008/0212464 A1 | 9/2008 | Kim et al. | |
| 2008/0232449 A1 | 9/2008 | Khan et al. | |
| 2009/0046800 A1 | 2/2009 | Xu et al. | |
| 2009/0073922 A1* | 3/2009 | Malladi et al. | 370/328 |
| 2009/0097466 A1 | 4/2009 | Lee et al. | |
| 2009/0129330 A1 | 5/2009 | Kim et al. | |
| 2009/0180561 A1 | 7/2009 | Kim et al. | |

OTHER PUBLICATIONS

3rd Generation Partnership Project (3GPP), "Technical Specification Group Radio Access Network; Evolved Universal Terrestrial Radio Access (E-UTRA); Multiplexing and Channel Coding (Release 8)," 3GPP TS 36.212, v8.4.0, Sep. 2008.

European Patent Office Application Serial No. 10802448.0, Search Report dated May 20, 2014, 13 pages.

The State Intellectual Property Office of the People's Republic of China Application Serial No. 201080033133.9, Office Action dated Oct. 15, 2014, 43 pages.

* cited by examiner

METHOD AND APPARATUS FOR TRANSMITTING UPLINK CONTROL INFORMATION

CROSS-REFERENCE TO RELATED APPLICATIONS

This application is a continuation of U.S. patent application Ser. No. 12/839,969, filed on Jul. 20, 2010, now U.S. Pat. No. 8,774,224, which claims the benefit of earlier filing date and right of priority to Korean Patent Application No. 10-2010-0069043, filed on Jul. 16, 2010, and also claims the benefit of U.S. Provisional Application No. 61/227,050, filed on Jul. 20, 2009, the contents of which are all hereby incorporated by reference herein in their entirety.

BACKGROUND OF THE INVENTION

1. Field of the Invention

The present invention relates to wireless communications, and more particularly, to a method and apparatus for transmitting uplink control information by a user equipment to a base station.

2. Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares long term evolution (LTE)-advanced which is an improved version of LTE based on orthogonal frequency division multiple access (OFDMA)/single carrier-frequency division multiple access (SC-FDMA) transmission. The LTE-advanced is one of promising candidates for the IMT-advanced.

A downlink denotes a link through which a base station (BS) transmits a signal to a user equipment (UE). An uplink denotes a link through which the UE transmits a signal to the BS. The LTE supports the use of 4 transmit (Tx) antennas in the downlink and supports the use of only one Tx antenna in the uplink. This is because the UE uses one power amplifier (AMP). As such, since the number of available Tx antennas is different between the downlink and the uplink, a peak/average system throughput is asymmetrical between the downlink and the uplink. This is one of major demerits of the LTE.

In the LTE-A, transmission of an uplink signal by using a plurality of Tx antennas (e.g., 4 Tx antennas) in the uplink is taken into account to improve an uplink throughput. When the UE transmits the uplink signal to the BS by using the 4 Tx antennas, uplink control information may be transmitted in a piggyback manner in a data transfer region. Accordingly, there is a need for a method and apparatus for reliably transmitting the uplink control signal by the UE in multiple-antenna transmission.

SUMMARY OF THE INVENTION

The present invention provides a method and apparatus for reliably transmitting uplink control information by a user equipment to a base station.

According to an aspect of the present invention, there is provided a method of transmitting uplink control information of a user equipment. The method comprising: generating the uplink control information repeatedly as many as uplink data transmission layers; modulating the uplink control information to generate a plurality of repeated modulation symbol; applying a precoding matrix to the plurality of repeated modulation symbols to generate a plurality of first precoded symbol; and transmitting the plurality of first precoded symbols respectively through a plurality of antennas in an uplink subframe comprising a plurality of single carrier-frequency division multiple access (SC-FDMA) symbols in a time domain and a plurality of subcarriers in a frequency domain.

According to another aspect of the present invention, there is provided a method of transmitting uplink control information of a user equipment. The method comprising: in a subframe comprising a plurality of symbols in a time domain, and a data region and a control region in a frequency domain, transmitting a transport block in the data region through a plurality of transmit (Tx) antennas by using a first multi input multi output (MIMO) transmission scheme; and transmitting uplink control information in the data region through the plurality of Tx antennas by using a second MIMO transmission scheme, wherein whether the second MIMO transmission scheme is identical to the first MIMO transmission scheme is determined according to a type of the uplink control information.

According to still another aspect of the present invention, there is provided a user equipment comprising: a radio frequency (RF) unit for transmitting and receiving a radio signal; and a processor coupled to the RF unit, wherein the processor modulates the uplink control information to generate a modulation symbol, repeats the modulation symbol to generate a plurality of repeated modulation symbols, applies a precoding matrix to the plurality of repeated modulation symbols to generate a plurality of first precoded symbol, and transmits the plurality of first precoded symbols respectively through a plurality of antennas in an uplink subframe comprising a plurality of single carrier-frequency division multiple access (SC-FDMA) symbols in a time domain and a plurality of subcarriers in a frequency domain.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, the following description will focus on the 3GPP LTE/LTE-A. However, technical features of the present invention are not limited thereto.

Figure 1:
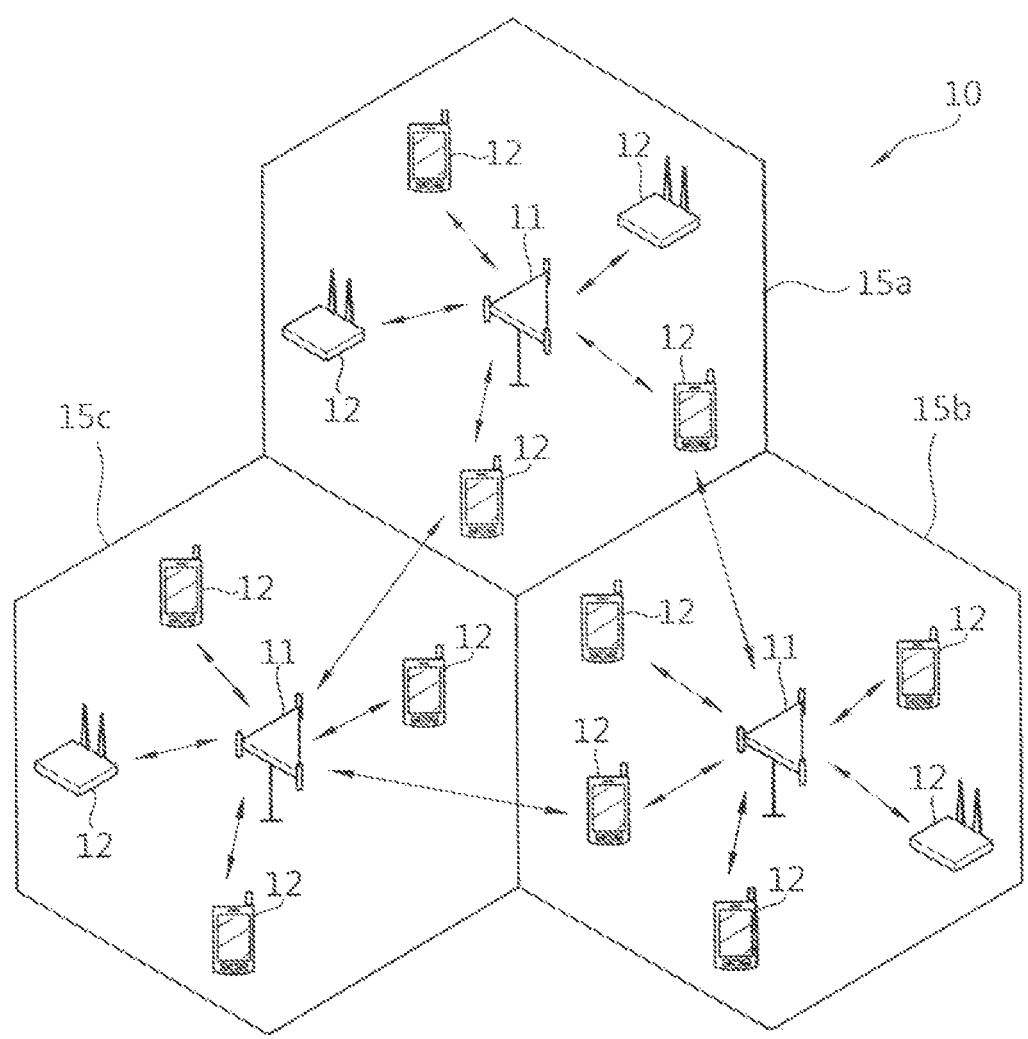
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. The BS 11 is generally a fixed station that communicates with the UE 12 and may be referred to as another terminology, such as an evolved node-B (eNB), a base transceiver system (BTS), an access point, an access network (AN), etc.

Hereinafter, a downlink (DL) implies communication link from the BS to the UE, and an uplink (UL) implies communication link from the UE to the BS. In the DL, a transmitter may be a part of the BS, and a receiver may be a part of the UE. In the UL, the transmitter may be a part of the UE, and the receiver may be a part of the BS.

The wireless communication system may be any one of a multiple input multiple output (MIMO) system, a multiple input single output (MISO) system, a single input single output (SISO) system, and a single input multiple output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

It is assumed hereinafter that the wireless communication system is the MIMO system. The Tx antenna denotes a physical or logical antenna used for transmission of one signal or stream. The Rx antenna denotes a physical or logical antenna used for reception of one signal or stream.

The MIMO system can operate by using various multiple antenna transmission and reception schemes such as space time block coding (STBC), space frequency block coding (SFBC), frequency switched transmit diversity (FSTD), time switched transmit diversity (TSTD), cyclic delay diversity (CDD), spatial multiplexing, transmit diversity, precoding vector switching (PVS), antenna selection, antenna virtualization, etc.

In the STBC, signals are transmitted by being separated in time and space domains, and signals received for each antenna are determined by a maximum likelihood combining scheme. The SFBC is a scheme for obtaining both a diversity gain and a multi-user scheduling gain in a corresponding domain by effectively applying selectivity in the space domain and a frequency domain. The FSTD is a scheme for dividing signals transmitted through multiple antennas in a frequency division manner. The TSTD is a scheme for dividing signals transmitted through multiple antennas in a time division manner. The CDD is a scheme for obtaining a diversity gain by using a path delay between Tx antennas. The spatial multiplexing is a scheme for increasing a data rate by transmitting different data for each antenna. The transmit diversity is a scheme for increasing transmission reliability by transmitting the same data in different antennas. As one type of transmit diversity schemes, the PVS is a scheme for obtaining a random beamforming gain by switching a precoding vector (i.e., weight) on a specific time, slot, or symbol basis. The antenna selection is a scheme for selecting an antenna for transmitting and receiving signals according to a channel state. The antenna virtualization is a scheme for obtaining an effect of receiving signals by a receiver through virtual antennas of which number is different from the number of antennas of a transmitter.

Figure 2:
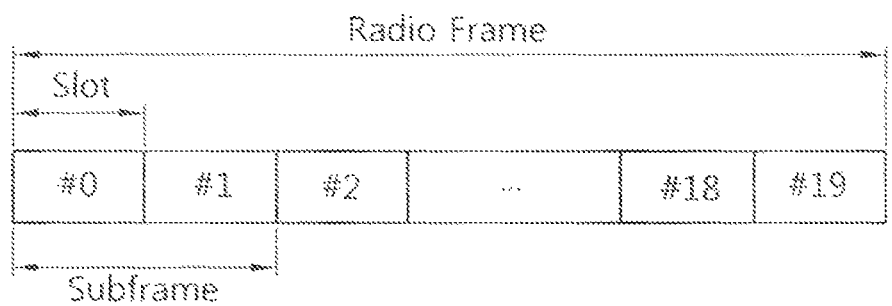
FIG. 2 shows a radio frame structure of $3^{rd}$ generation partnership project (3GPP) long term evolution (LTE).

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol duration, and can be referred to as other terms. For example, the OFDM symbol can also be referred to as an SC-FDMA symbol. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 2.

Figure 3:
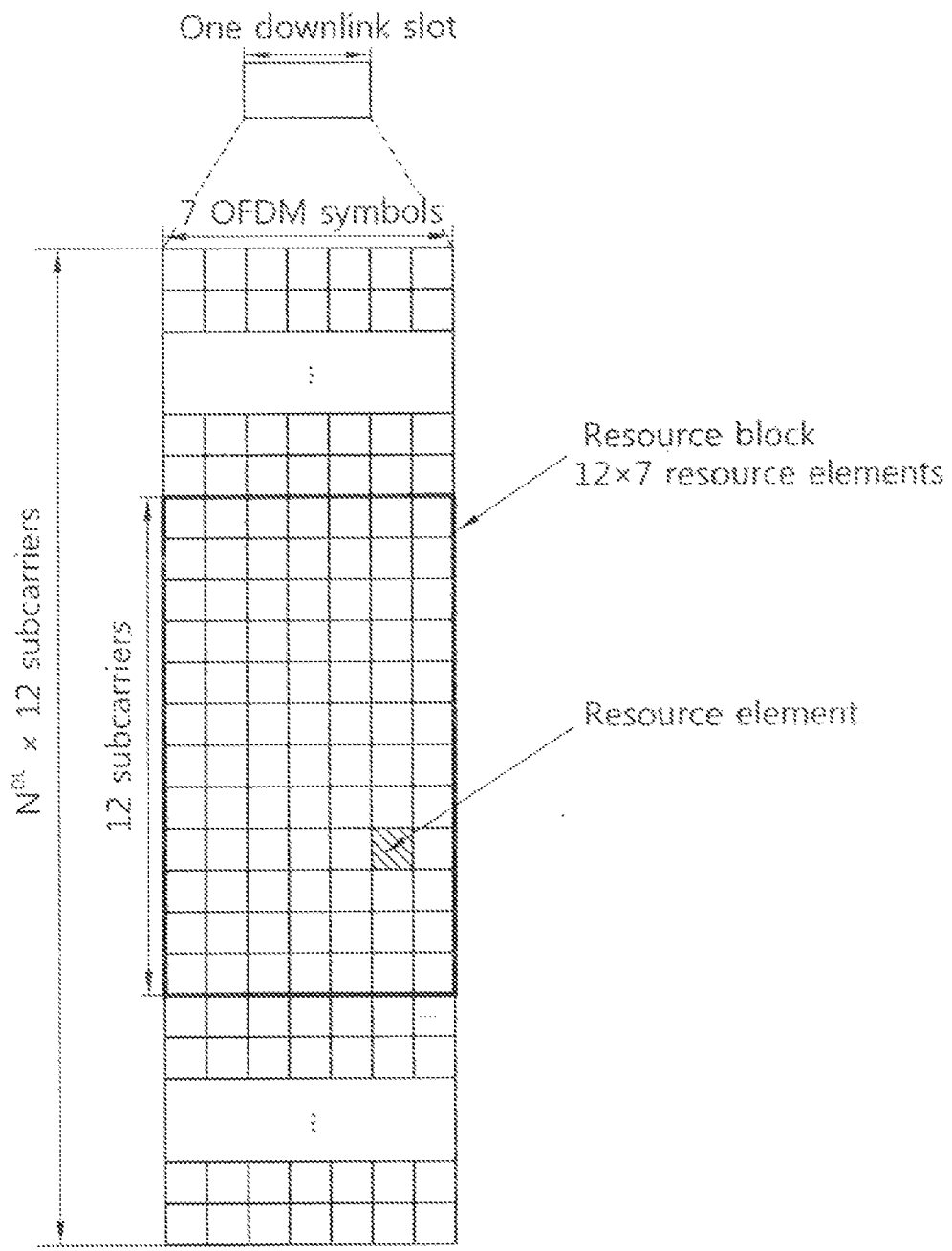
FIG. 3 shows an example of a resource grid for one downlink (DL) slot.

FIG. 3 shows an example of a resource grid for one DL slot.

In FDD and TDD radio frames, one slot includes a plurality of OFDM symbols in a time domain and a plurality of resource blocks (RBs) in a frequency domain. Hereinafter, the symbol may imply one OFDM symbol or one SC-FDMA symbol. The RB is a resource allocation unit, and includes a plurality of consecutive subcarriers in one slot.

Referring to FIG. 3, a slot (e.g., a DL slot included in a DL subframe) includes a plurality of OFDM symbols in the time domain. It is described herein that one DL slot includes 7 OFDM symbols and one RB includes 12 subcarriers in the frequency domain for exemplary purposes only, but the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the DL slot depends on a DL transmission bandwidth determined in a cell. The resource grid described in FIG. 3 can also apply to UL transmission.

Figure 4:
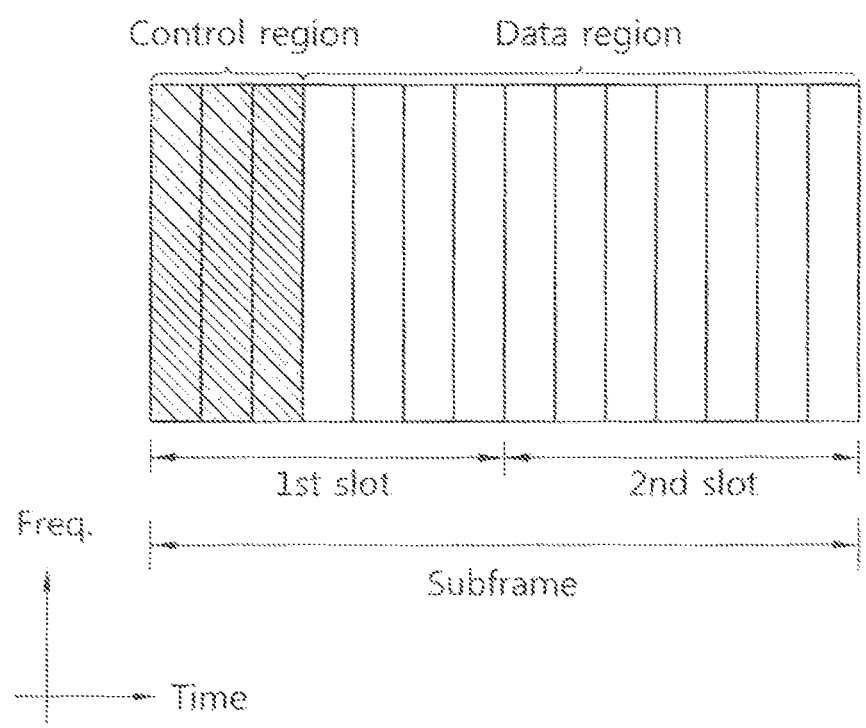
FIG. 4 shows a structure of a DL subframe.

FIG. 4 shows a structure of a DL subframe.

Referring to FIG. 4, the subframe includes two consecutive slots. Up to three OFDM symbols located in a front portion of a $1^{st}$ slot within the subframe correspond to a control region to be assigned with a physical downlink control channel (PDCCH). The remaining OFDM symbols correspond to a data region to be assigned with a physical downlink shared channel (PDSCH). In addition to the PDCCH, control channels such as a physical control format indicator channel (PCFICH), a physical hybrid automatic repeat request (HARQ) indicator channel (PHICH), etc., can be assigned to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region. The number of OFDM symbols included in the control region of the subframe can be known by using the PCFICH.

The control region consists of a plurality of control channel elements (CCEs) that is a logical CCE stream. Hereinafter, the CCE stream denotes a set of all CCEs constituting the control region in one subframe. The CCE corresponds to a plurality of resource element groups. For example, the CCE may correspond to 9 resource element groups. The resource element group is used to define mapping of a control channel onto a resource element. For example, one resource element group may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of $\{1, 2, 4, 8\}$.

Control information transmitted through the PDCCH is referred to as downlink control information (DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 5:
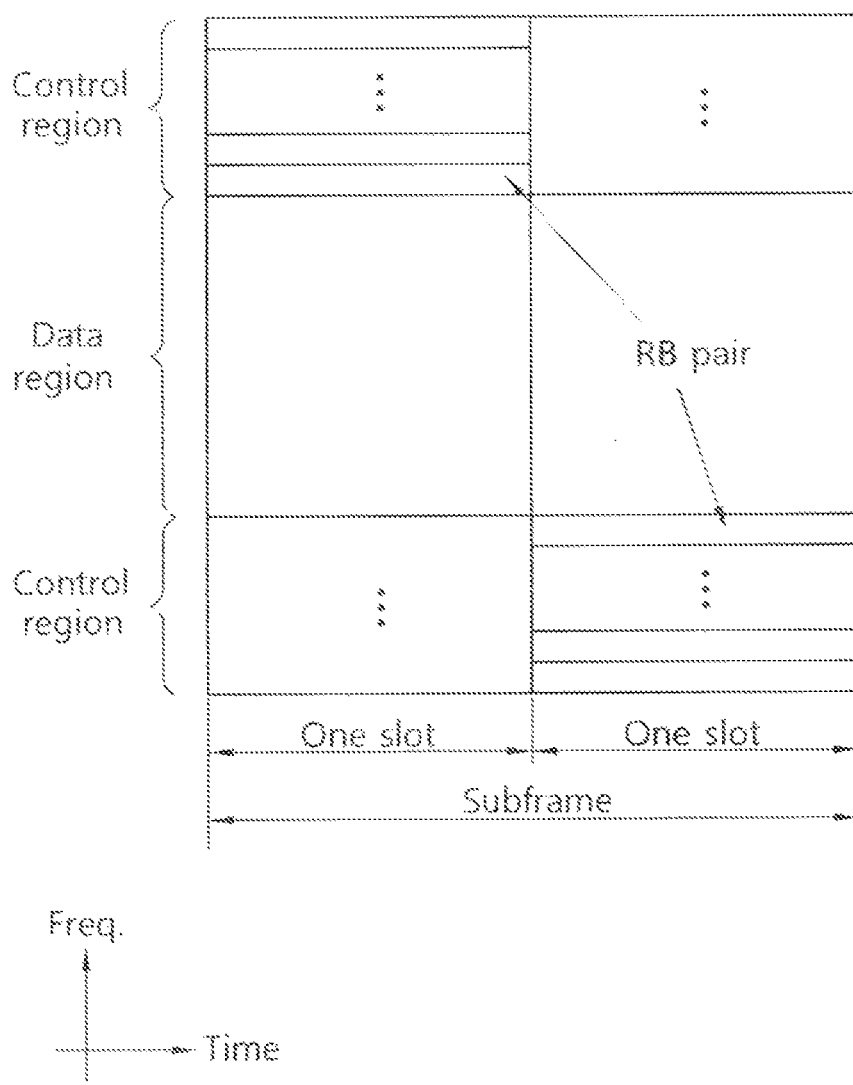
FIG. 5 shows an uplink (UL) subframe structure.

FIG. 5 shows a UL subframe structure.

Referring to FIG. 5, a UL subframe can be divided into a control region and a data region. The control region is a region where a physical uplink control channel (PUCCH) for carrying UL control information is allocated. The data region is a region where a physical uplink shared channel (PUSCH) for carrying user data is allocated.

The PUCCH for one UE is allocated in a pair of RBs. The RBs belonging to the RB pair occupy different subcarriers in each of two slots. This is called that the RB pair allocated to the PUCCH is frequency-hopped in a slot boundary.

The PUCCH can support multiple formats. That is, UL control information having a different number of bits for each subframe can be transmitted according to a modulation scheme. For example, when using a binary phase shift keying (BPSK) (i.e., a PUCCH format 1a), 1-bit UL control information can be transmitted on the PUCCH, and when using quadrature phase shift keying (QPSK) (i.e., a PUCCH format 1b), 2-bit UL control information can be transmitted on the PUCCH. In addition thereto, examples of the PUCCH format include a format 1, a format 2, a format 2a, a format 2b, etc. For this, the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

Figure 6:
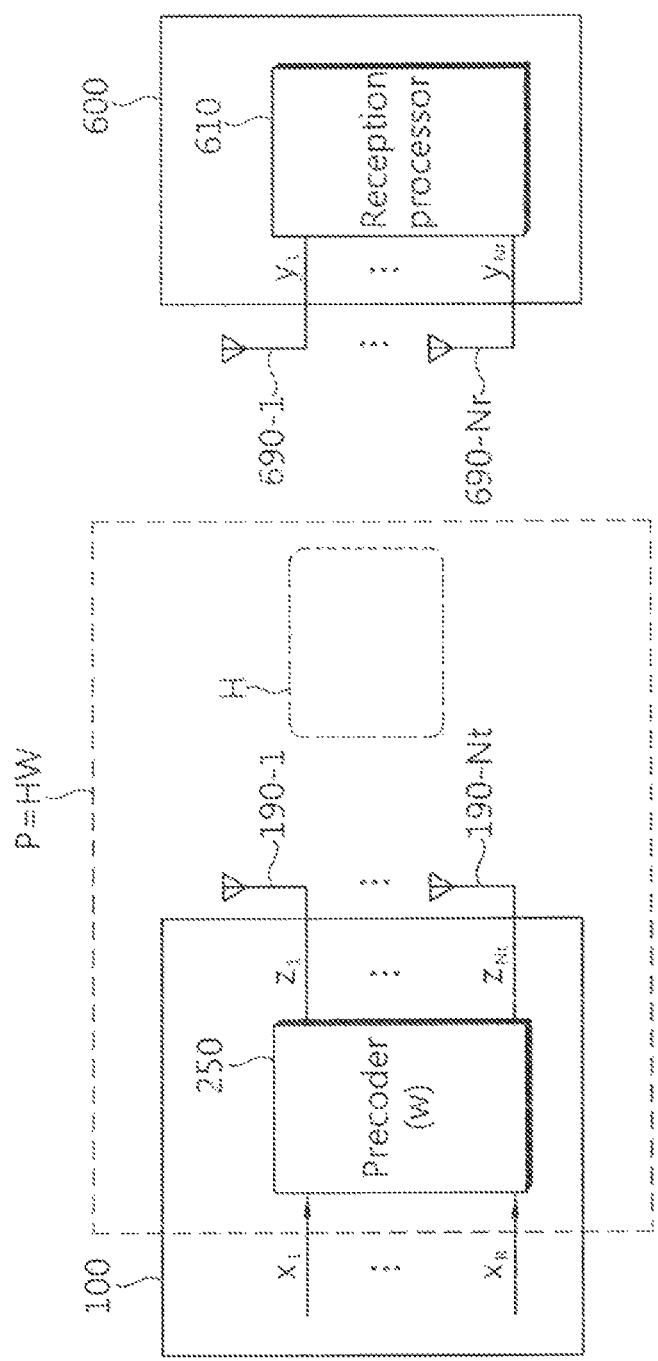
FIG. 6 shows a wireless communication system using a precoder.

FIG. 6 shows a wireless communication system using a precoder.

Referring to FIG. 6, a transmitter 100 includes a precoder 250 and Nt Tx antennas 190-1, . . . , 190-Nt. The precoder 250 is coupled to the Nt Rx antennas 190-1, . . . , 190-Nt (it can be coupled via a resource element mapper, a signal generator, an RF unit, etc. The structure of transmitter will be described later.). A receiver 600 includes a Rx processor 610 and Nr Rx antennas 690-1, . . . , 690-Nr. The transmitter 100 may be a part of a UE or a BS, and the receiver 600 may be a part of a BS or a UE.

A MIMO channel matrix H is formed between the Nt Tx antennas 190-1, . . . , 190-Nt and the Nr Rx antennas 690-1, . . . , 690-Nr. The MIMO channel matrix H has a size of Nr×Nt.

R spatial streams are input to the precoder 250. Each of the R spatial streams includes a plurality of spatial symbols. The spatial symbol may be a complex-valued symbol.

The precoder 250 can perform precoding as expressed by Equation 1.

$$z(k) = W \cdot x(k) \quad \text{[Equation 1]}$$

Herein, $z(k)=[z_1(k)\ z_2(k)\ \ldots\ z_{Nt}(k)]^T$ denotes a Tx symbol vector, W denotes a precoding matrix having a size of Nt×R, and $x(k)=[x_1(k)\ x_2(k)\ \ldots\ x_R(k)]^T$ denotes a spatial symbol vector. R denotes a rank.

The transmitter 100 transmits the Tx symbol vector z(k) through the Nt Tx antennas 190-1, . . . , 190-Nt.

The receiver 600 receives an Rx signal vector $y=[y_1\ y_2\ \ldots\ y_{Nr}]^T$ through the Nr Rx antennas 690-1, . . . , 690-Nr. The Rx signal vector y can be expressed by Equation 2.

$$\begin{aligned} y &= HWx + n \\ &= Px + n \end{aligned} \quad \text{(Equation 2)}$$

Herein, $n=[n_1\ n_2\ \ldots\ n_{Nr}]^T$ denotes a noise vector, and P=HW denotes a precoded channel matrix.

The wireless communication system using the precoder may use codebook based precoding or non-codebook based precoding. When using the codebook based precoding, UL control information transmitted by the UE to the BS may include an index indicating a precoding matrix/vector in a codebook. When using the non-codebook based precoding, the UL control information may be information indicating a channel state.

When using the codebook based precoding, the codebook includes precoding vectors or precoding matrices that can be applied to each rank. Further, an antenna and each precoding vector/matrix have its own index. Therefore, the receiver can report a suitable precoding vector/matrix to the transmitter. Alternatively, which precoding vector/matrix is applied can be reported by the transmitter to the receiver by using the index. When using the codebook based precoding, the number of precoding vectors/matrices included in the codebook is limited, and thus performance may not be well compare to the case of using the non-codebook based precoding. However, the codebook based precoding has an advantage in that UL control signal feedback overhead is decreased.

Table 1 below shows an exemplary codebook that can be used for DL transmission by a transmitter having 2 Tx antennas. And table 2 shows an exemplary codebook that can be used for DL transmission by a transmitter having 4 Tx antennas. Such codebooks may be used for multiple antennas transmission to a UE by a BS (i.e. DL transmission).

TABLE 1

| Codebook | Number of rank | |
|---|---|---|
| index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In table 2, $W_n^{\{s\}}$ is defined as $W_n=I-2u_n u_n^H/u_n^H u_n$, the set $\{s\}$ which is the column set of matrix $W_n$. And I denotes four-by-four identity matrix.

As shown in the table 1, the codebook for 2Tx antennas contains 7 precoding vector/matrix and the identity matrix is used for open-loop transmission only, thus 6 precoding vector/matrix are utilized for closed-loop transmission. As shown in the table 2, the codebook for 4Tx antennas has 64 precoding elements and 16 precoding elements are used for each transmission rank.

In the case of supporting MIMO transmission in UL transmission, a codebook can be used for UL transmission like DL transmission. For example, table 3 to table 6 can be used for UL transmission.

Table 3 below shows an exemplary codebook that can be used for UL transmission by a UE having 2 Tx antenna ports.

TABLE 3

| Codebook | Number of rank | |
|---|---|---|
| index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |

TABLE 3-continued

| Codebook | Number of rank | |
|---|---|---|
| index | 1 | 2 |
| 1 | $\frac{1}{\sqrt{2}}\begin{bmatrix}1\\-1\end{bmatrix}$ | |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | |
| 5 | $\frac{1}{\sqrt{2}}\begin{bmatrix}0\\1\end{bmatrix}$ | |

Table 4 below shows an exemplary codebook that can be used for 4 Tx antenna ports and rank 1 transmission.

TABLE 4

Codebook

Index 0 to 7:
$\frac{1}{2}\begin{bmatrix}1\\1\\1\\-1\end{bmatrix}$, $\frac{1}{2}\begin{bmatrix}1\\1\\j\\j\end{bmatrix}$, $\frac{1}{2}\begin{bmatrix}1\\1\\-1\\1\end{bmatrix}$, $\frac{1}{2}\begin{bmatrix}1\\1\\-j\\-j\end{bmatrix}$, $\frac{1}{2}\begin{bmatrix}1\\j\\1\\j\end{bmatrix}$, $\frac{1}{2}\begin{bmatrix}1\\j\\j\\1\end{bmatrix}$, $\frac{1}{2}\begin{bmatrix}1\\j\\-1\\-j\end{bmatrix}$, $\frac{1}{2}\begin{bmatrix}1\\j\\-j\\-1\end{bmatrix}$ Index 8 to 15:
$\frac{1}{2}\begin{bmatrix}1\\-1\\1\\1\end{bmatrix}$, $\frac{1}{2}\begin{bmatrix}1\\-1\\j\\-j\end{bmatrix}$, $\frac{1}{2}\begin{bmatrix}1\\-1\\-1\\-1\end{bmatrix}$, $\frac{1}{2}\begin{bmatrix}1\\-1\\-j\\-j\end{bmatrix}$, $\frac{1}{2}\begin{bmatrix}1\\-j\\1\\-j\end{bmatrix}$, $\frac{1}{2}\begin{bmatrix}1\\-j\\j\\-1\end{bmatrix}$, $\frac{1}{2}\begin{bmatrix}1\\-j\\-1\\j\end{bmatrix}$, $\frac{1}{2}\begin{bmatrix}1\\-j\\-j\\1\end{bmatrix}$ Index 16 to 23:
$\frac{1}{2}\begin{bmatrix}1\\0\\1\\0\end{bmatrix}$, $\frac{1}{2}\begin{bmatrix}1\\0\\-1\\0\end{bmatrix}$, $\frac{1}{2}\begin{bmatrix}1\\0\\j\\0\end{bmatrix}$, $\frac{1}{2}\begin{bmatrix}1\\0\\-j\\0\end{bmatrix}$, $\frac{1}{2}\begin{bmatrix}0\\1\\0\\1\end{bmatrix}$, $\frac{1}{2}\begin{bmatrix}0\\1\\0\\-1\end{bmatrix}$, $\frac{1}{2}\begin{bmatrix}0\\1\\0\\j\end{bmatrix}$, $\frac{1}{2}\begin{bmatrix}0\\1\\0\\-j\end{bmatrix}$ Table 5 below shows an exemplary codebook that can be used for 4 Tx antenna ports and rank 2 transmission.

TABLE 5

Codebook

Index 0 to 7:
$\frac{1}{2}\begin{bmatrix}1 & 0\\1 & 0\\0 & 1\\0 & -j\end{bmatrix}$, $\frac{1}{2}\begin{bmatrix}1 & 0\\1 & 0\\0 & 1\\0 & j\end{bmatrix}$, $\frac{1}{2}\begin{bmatrix}1 & 0\\-j & 0\\0 & 1\\0 & 1\end{bmatrix}$, $\frac{1}{2}\begin{bmatrix}1 & 0\\-j & 0\\0 & 1\\0 & -1\end{bmatrix}$, $\frac{1}{2}\begin{bmatrix}1 & 0\\-1 & 0\\0 & 1\\0 & -j\end{bmatrix}$, $\frac{1}{2}\begin{bmatrix}1 & 0\\-1 & 0\\0 & 1\\0 & j\end{bmatrix}$, $\frac{1}{2}\begin{bmatrix}1 & 0\\j & 0\\0 & 1\\0 & 1\end{bmatrix}$, $\frac{1}{2}\begin{bmatrix}1 & 0\\j & 0\\0 & 1\\0 & -1\end{bmatrix}$ Index 8 to 15:
$\frac{1}{2}\begin{bmatrix}1 & 0\\0 & 1\\1 & 0\\0 & 1\end{bmatrix}$, $\frac{1}{2}\begin{bmatrix}1 & 0\\0 & 1\\1 & 0\\0 & -1\end{bmatrix}$, $\frac{1}{2}\begin{bmatrix}1 & 0\\0 & 1\\-1 & 0\\0 & 1\end{bmatrix}$, $\frac{1}{2}\begin{bmatrix}1 & 0\\0 & 1\\-1 & 0\\0 & -1\end{bmatrix}$, $\frac{1}{2}\begin{bmatrix}1 & 0\\0 & 1\\0 & 1\\1 & 0\end{bmatrix}$, $\frac{1}{2}\begin{bmatrix}1 & 0\\0 & 1\\0 & -1\\1 & 0\end{bmatrix}$, $\frac{1}{2}\begin{bmatrix}1 & 0\\0 & 1\\0 & 1\\-1 & 0\end{bmatrix}$, $\frac{1}{2}\begin{bmatrix}1 & 0\\0 & 1\\0 & -1\\-1 & 0\end{bmatrix}$ Table 6 below shows an exemplary codebook that can be used for 4 Tx antenna ports and rank 3 transmission.

TABLE 6

Codebook

| Index 0 to 5 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ |
| --- | --- | --- | --- | --- | --- | --- |
| Index 6 to 11 | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

UL data is generally transmitted in the data region to which the PUSCH is allocated, but UL control information can also be transmitted together. When the UL control information is transmitted together with data in the PUSCH region, it is called that the UL control information is transmitted in a piggyback manner. A case where the UL control information is transmitted in a piggyback manner may occur when UL data transmission caused by a UL grant and feedback transmission are requested in the same UL subframe.

Figure 7:
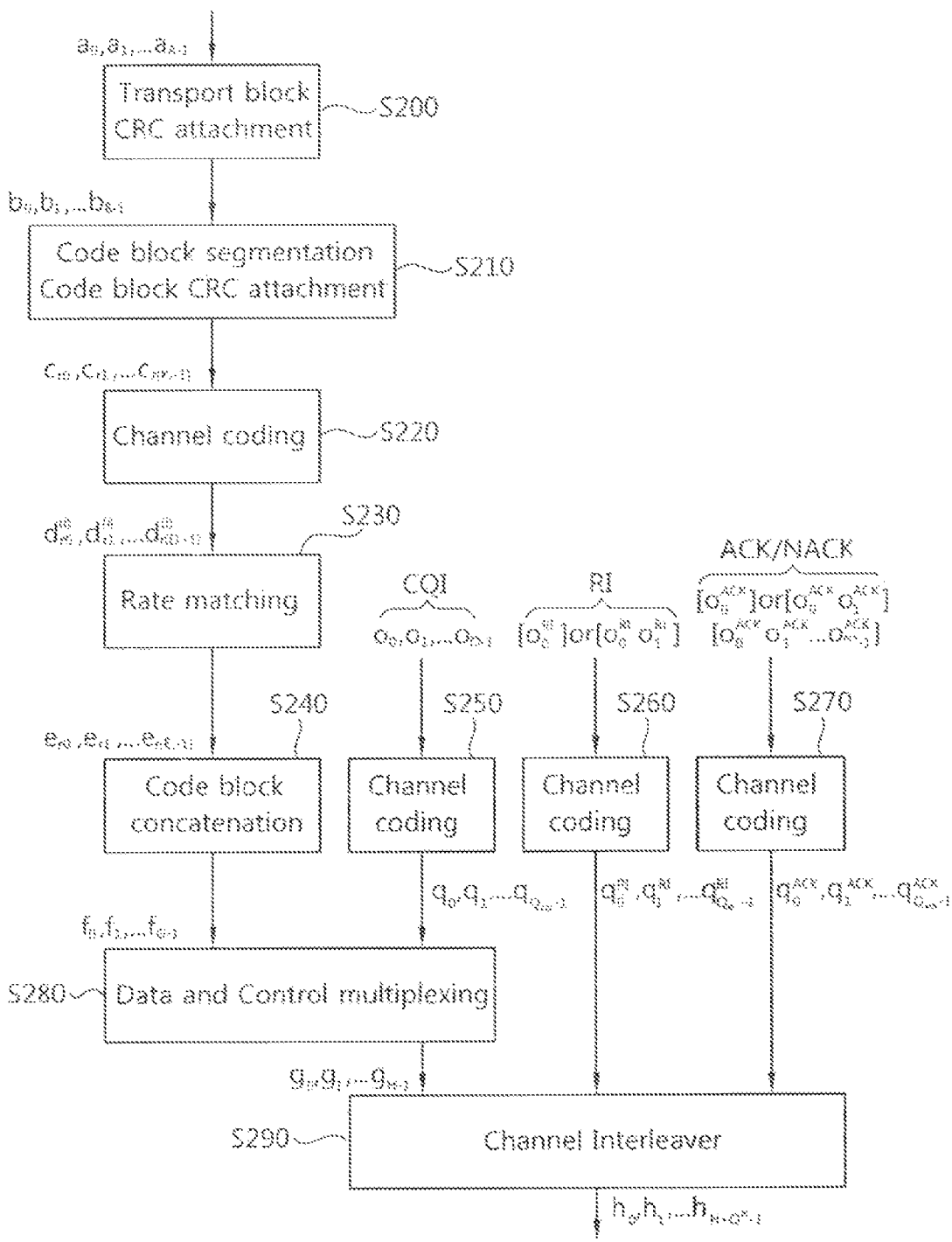
FIG. 7 shows a process of multiplexing UL control information and UL data on a physical uplink shared channel (PUSCH).

FIG. 7 shows a process of multiplexing UL control information and UL data on a PUSCH.

Referring to FIG. 7, data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$ (step 200). Herein, subscripts B, A, L satisfies B=A+L. Equation 3 below shows a relationship between $a_k$ and $b_k$.

$$b_k = a_k \text{ for } k=0,1,\ldots,A-1$$

$$b_k = p_{k-A} \text{ for } k=A, A+1, \ldots, A+L-1 \quad \text{[Equation 3]}$$

The CRC-attached bits $b_0, b_1, \ldots, b_{B-1}$ are segmented in a code block unit, and the CRC parity bits are re-attached in the code block unit (step 210). $c_{r0}, c_{r1}, \ldots, c_{r(Kr-1)}$ denote a bit sequence output after the code block segmentation. Herein, if a total number of code blocks is C, r denotes a code block number, and Kr denotes the number of bits for the code block number r.

Channel coding is performed on a bit sequence for a given code block (step 220). $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits (step 230). Then, code block concatenation is performed on the rate-matched bits (step 240). As a result, a data bit sequence $f_0, f_1, \ldots, f_{G-1}$ is generated. Herein, G denotes a total number of encoded bits used to transmit bits other than bits that is used in control information transmission when the control information is multiplexed on a PUSCH.

The control information (UL control information) can be multiplexed together with data (UL data). The data and the control information can use different coding rates by allocating a different number of coded symbols for transmission thereof. Examples of the control information include a channel quality indicator (CQI), a rank indicator (RI), an acknowledgement/not-acknowledgement (ACK/NACK), etc.

Channel coding is performed on CQI values $o_0, o_1, \ldots, o_{O-1}$ (where O is the number of CQI bits) to generate a control information bit sequence $q_0, q_1, \ldots, q_{Q-1}$ (step 250). Channel coding is performed on RI values $O_0^{RI}$ or RI values $o_0^{RI}$ and $o_1^{RI}$ to generate a control information bit sequence $q_0^{RI}, q_1^{RI}, \ldots, q_{QRI-1}^{RI}$ (step S260). Likewise, channel coding is performed on ACK/NACK values $o_0^{ACK}$ or ACK/NACK values $o_0^{ACK}$ and $o_1^{ACK}$ or ACK/NACK values $o_0^{ACK}, o_1^{ACK}, \ldots, O_{oACK-1}^{ACK}$ to generate a control information bit sequence $q_0^{ACK}, q_1^{ACK}, \ldots, q_{QACK-1}^{ACK}$ (step S270).

A data bit sequence $f_0, f_1, \ldots, f_{G-1}$ is generated as described above and is multiplexed together with the control information bit sequence $q_0, q_1, \ldots, q_{Q-1}$ of the CQI into a multiplexed sequence $g_0, g_1, \ldots, g_{H-1}$ (step 280). In a process of multiplexing, the control information bit sequence $q_0, q_1, \ldots, q_{Q-1}$ of the CQI can be arranged first and thereafter the data bit sequence $f_0, f_1, \ldots, f_{G-1}$ can be arranged. That is, if H=G+Q, $[g_0, g_1, \ldots, g_{H-1}]$ may be configured such as $[q_0, q_1, \ldots, q_{Q-1}, f_0, f_1, \ldots, f_{G-1}]$.

The multiplexed sequence $g_0, g_1, \ldots, g_{H-1}$ is mapped to a modulation sequence $h_0, h_1, \ldots, h_{H'-1}$ by a channel interleaver (step 280). In addition, the control information bit sequence of the RI or the ACK/NACK is mapped to modulation sequences $h_0, h_1, \ldots, h_{H'-1}$ by the channel interleaver. Herein, $h_i$ is a modulation symbol on a constellation, where H'=H+$Q_{RI}$. Each modulation symbol of the modulation sequence $h_0, h_1, \ldots, h_{H'-1}$ is mapped to a resource element for the PUSCH. The resource element is a subframe allocation unit defined with one SC-FDMA symbol (or OFDMA symbol) and one subcarrier.

Figure 8:
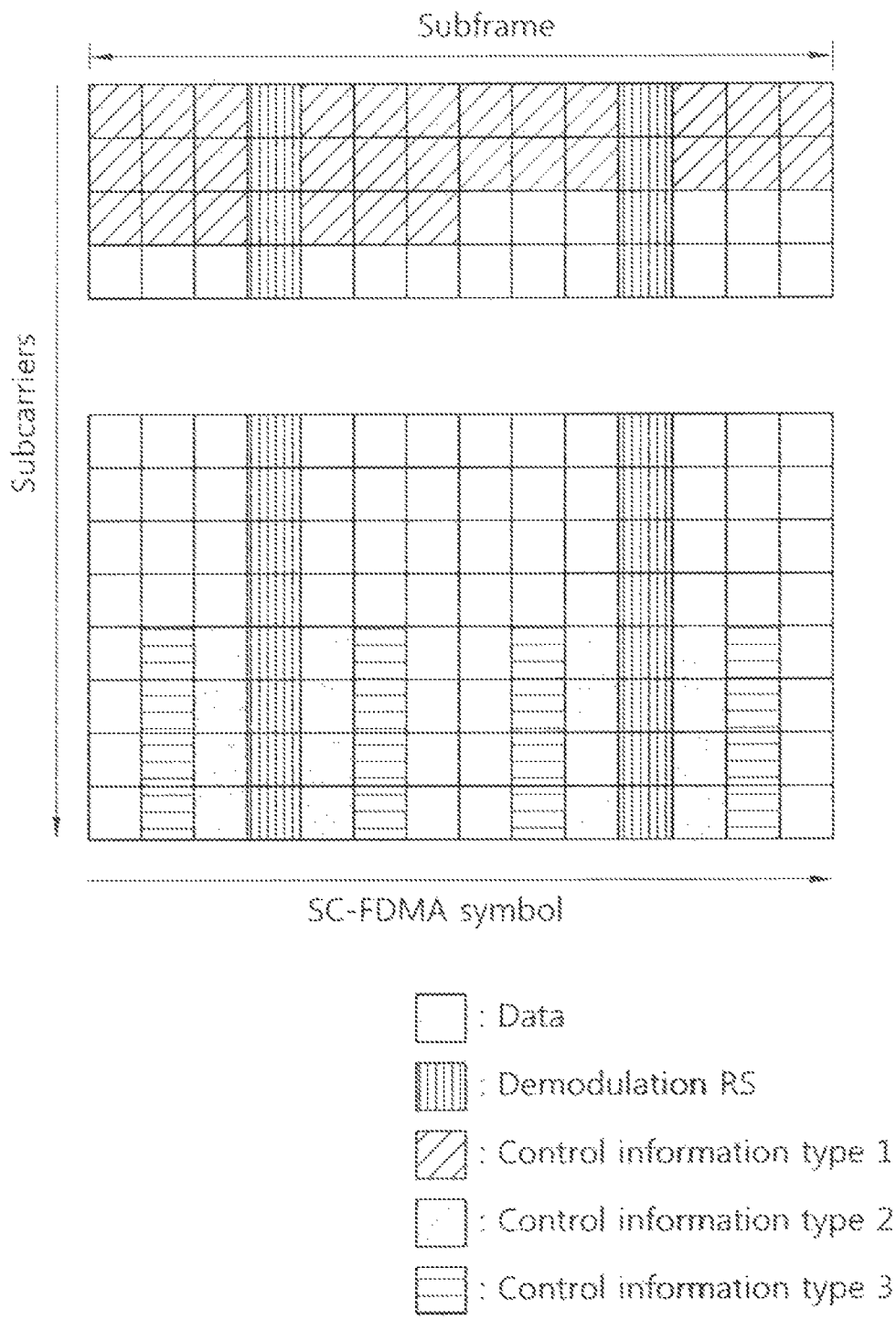
FIG. 8 shows resource mapping on a PUSCH.

FIG. 8 shows resource mapping on a PUSCH.

A method of performing multiplexing in a PUSCH region may differ according to a type of control information. As shown in FIG. 8, in the PUSCH region of a subframe, a demodulation reference signal (DM RS) is allocated to one symbol in a $1^{st}$ slot or a $2^{nd}$ slot. The DM RS is a reference signal used for demodulation of data and control information transmitted in the PUSCH region. An example of allocating the DM RS to a $4^{th}$ symbol in the $1^{st}$ and $2^{nd}$ slots is shown in FIG. 8. In this case, a specific type of control information may be CQI/PMI (i.e., a control information type 1), and can be allocated from a $1^{st}$ symbol to a last available symbol of the subframe with respect to one subcarrier and thereafter can be allocated to a next subcarrier. That is, it can be allocated from the $1^{st}$ symbol to the last symbol of the subframe except for a symbol to which the DM RS is allocated.

Another type of control information is ACK/NACK (i.e., a control information type 2), and can be allocated to a symbol adjacent to the symbol to which the DM RS is allocated. The number of symbols to which the ACK/NACK is allocated may be up to 4. By using such an allocation method, the ACK/NACK can use the best channel estimation result. The ACK/NACK can be allocated to a symbol adjacent to the symbol to which the DM RS is allocated after puncturing data, i.e., PUSCH data. The RI (i.e., a control information type 3) can be allocated to a symbol adjacent to the symbol to which the ACK/NACK can be allocated.

In the data region to which the PUSCH is allocated, different resource allocations can be achieved according to a transmission scheme used in UL transmission. For example, when SC-FDMA is used as the transmission scheme, a discrete Fourier transform (DFT)-spread symbol stream is allocated (or mapped) to consecutive subcarriers or equidistantly spaced subcarriers in the data region. On the other hand, when clustered SC-FDMA is used as the transmission scheme, among DFT-spread N symbol streams, M(<N) symbol streams are allocated or mapped to consecutive subcarriers, and the remaining N-M symbol streams are allocated (or mapped) to consecutive subcarriers spaced apart by a specific interval from the subcarrier to which M symbols are allocated (or mapped). That is, when using the clustered SC-FDMA scheme, subcarriers to which symbols are mapped may be consecutive in each cluster resource, and each cluster resource may be located discontinuously. When using the clustered SC-FDMA, there is an advantage in that frequency selective scheduling can be performed.

First, a structure of a transmitter will be described when using SC-FDMA.

Figure 9:
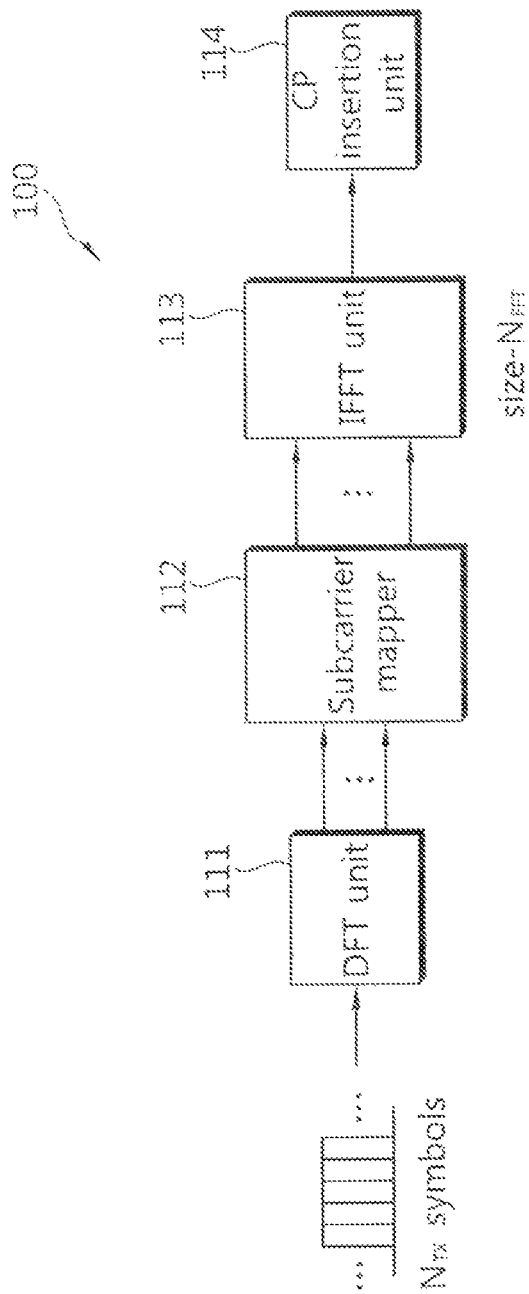
FIG. 9 is a block diagram showing an exemplary structure of a transmitter when using single carrier-frequency division multiple access (SC-FDMA).

FIG. 9 is a block diagram showing an exemplary structure of a transmitter when using SC-FDMA.

Referring to FIG. 9, a transmitter 100 includes a discrete Fourier transform (DFT) unit 111, a subcarrier mapper 112, an inverse fast Fourier transform (IFFT) unit 113, and a CP insertion unit 114. The transmitter 100 may further include a channel coding unit (not shown), a modulator (not shown), and an RF unit (not shown). The channel coding unit performs channel coding on information bits to generate a coded bit. The information bits may be data transmitted from the transmitter. The modulator maps the coed bit onto a symbol for representing a position on a signal constellation to generate modulated symbols. There is no restriction on a modulation scheme. The modulation scheme may be m-phase shift keying (m-PSK) or m-quadrature amplitude modulation (m-QAM). The modulated symbols are input to the DFT unit 111.

The DFT unit 111 performs DFT on the input symbols to output complex-valued symbols. For example, if $N_{Tx}$ symbols are input, a DFT size is $N_{Tx}$ (where $N_{Tx}$ is a natural number).

The subcarrier mapper 112 maps the complex-valued symbols to respective subcarriers in a frequency domain. The complex-valued symbols can be mapped to resource elements corresponding to a resource block allocated for data transmission. The IFFT unit 113 performs IFFT on the input symbols to output a baseband signal for data as a time-domain signal. If an IFFT size is $N_{FFT}$, $N_{FFT}$ can be determined by a channel bandwidth (where $N_{FFT}$ is a natural number). The CP insertion unit 114 copies a rear part of the baseband signal for the data and inserts the copy in front of the baseband signal for the data. Inter symbol interference (ISI) and inter carrier interference (ICI) are avoided by CP inserting, and thus orthogonality can be maintained even in a multi-path channel.

As such, a transmission mechanism in which IFFT is performed after DFT spreading is referred to as SC-FDMA. The SC-FDMA can also be referred to as DFT spread-OFDM (DFTs-OFDM). In the SC-FDMA, a peak-to-average power ratio (PAPR) or a cubic metric (CM) can be decreased. When using the SC-FDMA transmission mechanism, transmit power efficiency can be increased in a UE of which power consumption is limited. Accordingly, a user throughput can be increased.

Figure 10:
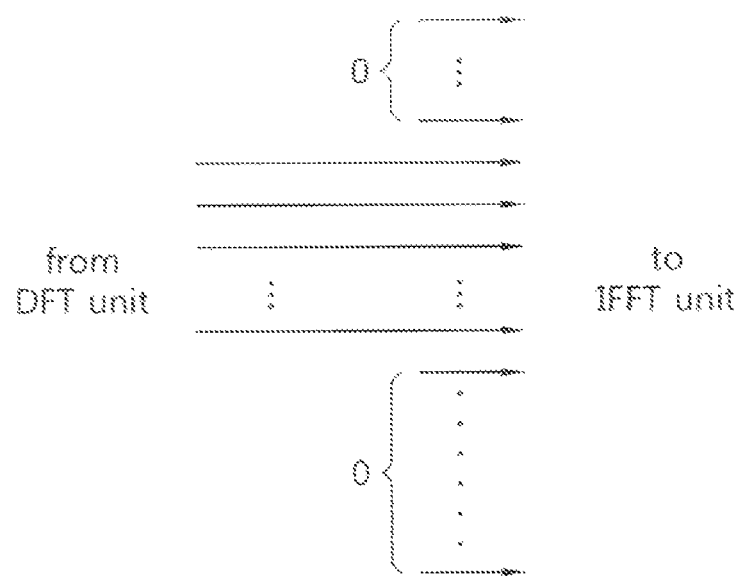
FIG. 10 and FIG. 11 show exemplary methods of mapping complex-valued symbols onto respective subcarriers in a frequency domain by a subcarrier mapper of FIG. 9.
Figure 11:
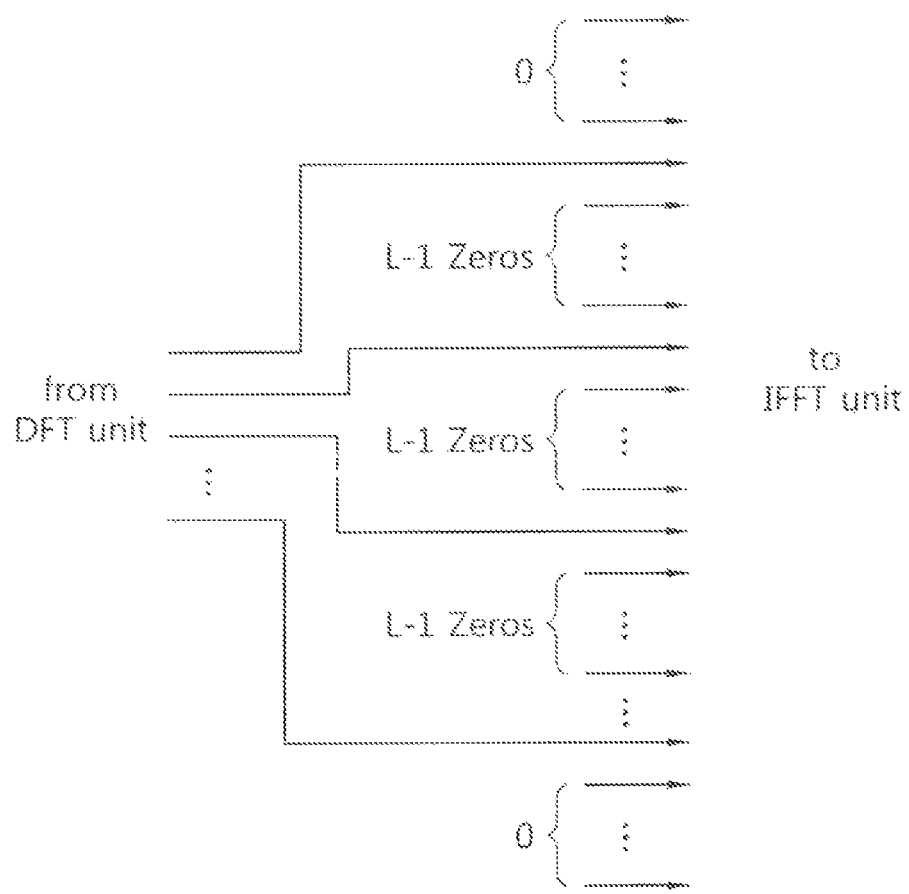

FIG. 10 and FIG. 11 show exemplary methods of mapping complex-valued symbols onto respective subcarriers in a frequency domain by the subcarrier mapper of FIG. 9.

Referring to FIG. 10, the subcarrier mapper maps complex-valued symbols output from the DFT unit onto consecutive subcarriers in the frequency domain. '0' is inserted to subcarriers onto which the plurality of complex-valued symbols are not mapped. This is referred to as localized mapping.

Referring to FIG. 11, the subcarrier mapper inserts L-1 '0's (where L is a natural number) into every two consecutive complex-valued symbols output from the DFT unit. That is, the complex-valued symbols output from the DFT unit are mapped onto subcarriers equidistantly distributed in the frequency domain. This is referred to as distributed mapping. When the subcarrier mapper uses the localized mapping of FIG. 10 or the distributed mapping of FIG. 11, a single carrier property is maintained. The localized mapping is used in 3GPP LTE.

Figure 12:
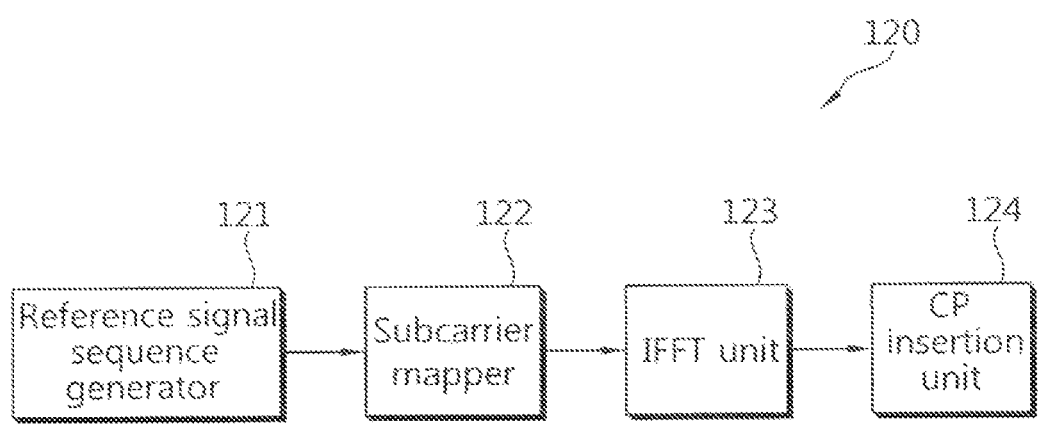
FIG. 12 is a block diagram showing an example of a reference signal processor.

A reference signal for demodulating UL data is transmitted on a PUSCH (as described above, such a reference signal is referred to as a demodulation reference signal (DM RS)). Unlike UL data, the reference signal can be mapped onto the subcarrier in the frequency domain and thereafter can be transmitted by performing IFFT, without having to perform DFT. A module for generating the reference signal can be referred to as a reference signal processor. The reference signal processor can have a structure as shown in FIG. 12 below. The reference signal processor may be a part of the transmitter.

FIG. 12 is a block diagram showing an example of a reference signal processor.

Referring to FIG. 12, a reference signal processor 120 includes a reference signal generator 121, a subcarrier mapper 122, an IFFT unit 123, and a CP insertion unit 124.

The reference signal generator 121 generates a reference signal sequence consisting of complex-valued elements. The subcarrier mapper 122 maps the complex-valued elements constituting the reference signal sequence onto respective subcarriers. If it is a reference signal sequence for a DM RS, the complex-valued elements are mapped to subcarriers of DM RS symbols in a subframe. The reference signal sequence for the DM RS (i.e., demodulation reference signal) can be mapped to subcarriers by using localized mapping. The IFFT unit 123 performs IFFT on input symbols to output a baseband signal for a reference signal as a time-domain signal. The CP insertion unit 124 copies a rear part of the baseband signal for the reference signal and inserts the copy in front of the baseband signal for the reference signal.

Figure 13:
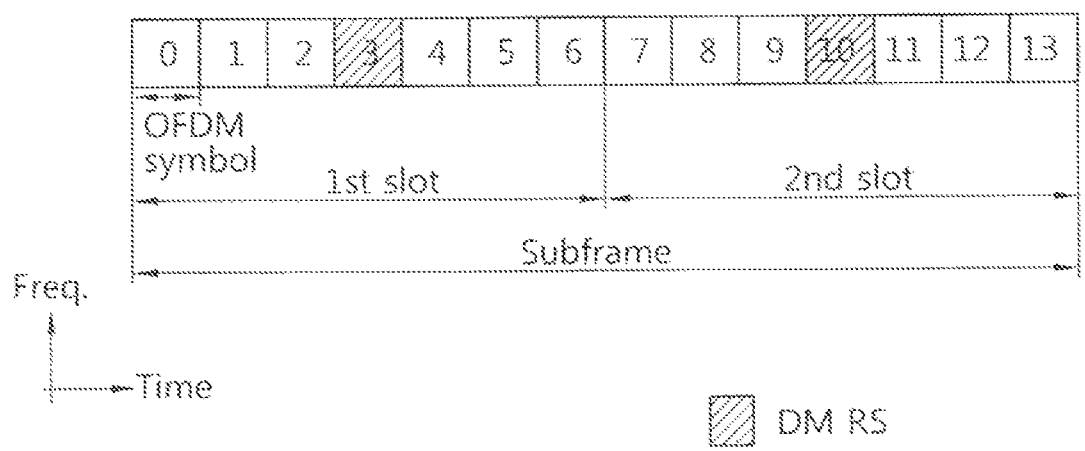
FIG. 13 shows an exemplary structure of a demodulation reference signal (DM RS) when using a normal cyclic prefix (CP).
Figure 14:
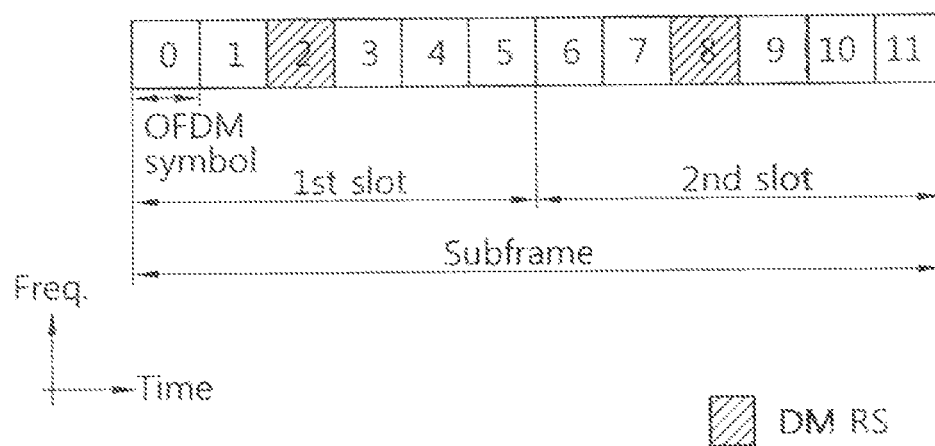
FIG. 14 shows an exemplary structure of a DM RS when using an extended CP.

In the subframe, the DM RS can have the same structure as FIG. 13 and FIG. 14 in a time domain.

FIG. 13 shows an exemplary structure of a DM RS when using a normal CP. Referring to FIG. 13, a subframe includes a $1^{st}$ slot and a $2^{nd}$ slot. Each of the $1^{st}$ slot and the $2^{nd}$ slot includes 7 OFDM symbols. 14 OFDM symbols in the subframe are numbered with symbol indices 0 to 13. The DM RS is transmitted by using OFDM symbols having symbol indices 3 and 10. Data or control information can be transmitted by using the remaining OFDM symbols other than the OFDM symbols in which the DM RS is transmitted.

FIG. 14 shows an exemplary structure of a DM RS when using an extended CP. Referring to FIG. 14, a subframe includes a $1^{st}$ slot and a $2^{nd}$ slot. Each of the $1^{st}$ slot and the $2^{nd}$ slot includes 6 OFDM symbols. 12 OFDM symbols in the subframe are numbered with symbol indices 0 to 11. The DM RS is transmitted by using OFDM symbols having symbol indices 2 and 8. Data or control information can be transmitted by using the remaining OFDM symbols other than the OFDM symbols in which the DM RS is transmitted.

Now, exemplary structures of a transmitter will be described when using clustered SC-FDMA (or clustered DFTs-OFDM).

Figure 15:
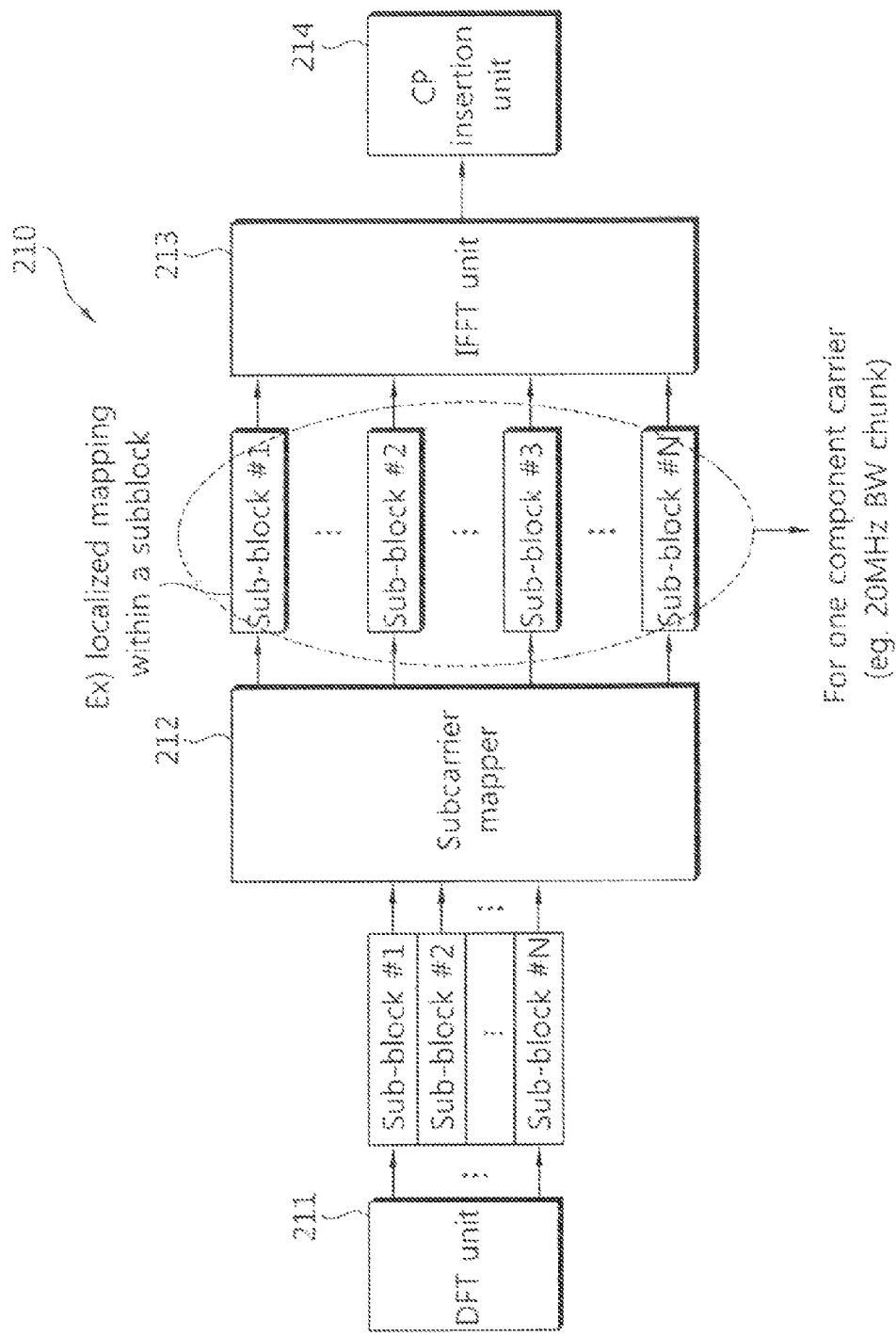
FIG. 15 is a block diagram showing an exemplary structure of a transmitter when clustered SC-FDMA (or clustered DFT spread-OFDM (DFTs-OFDM)) is used for a single carrier.
Figure 16:
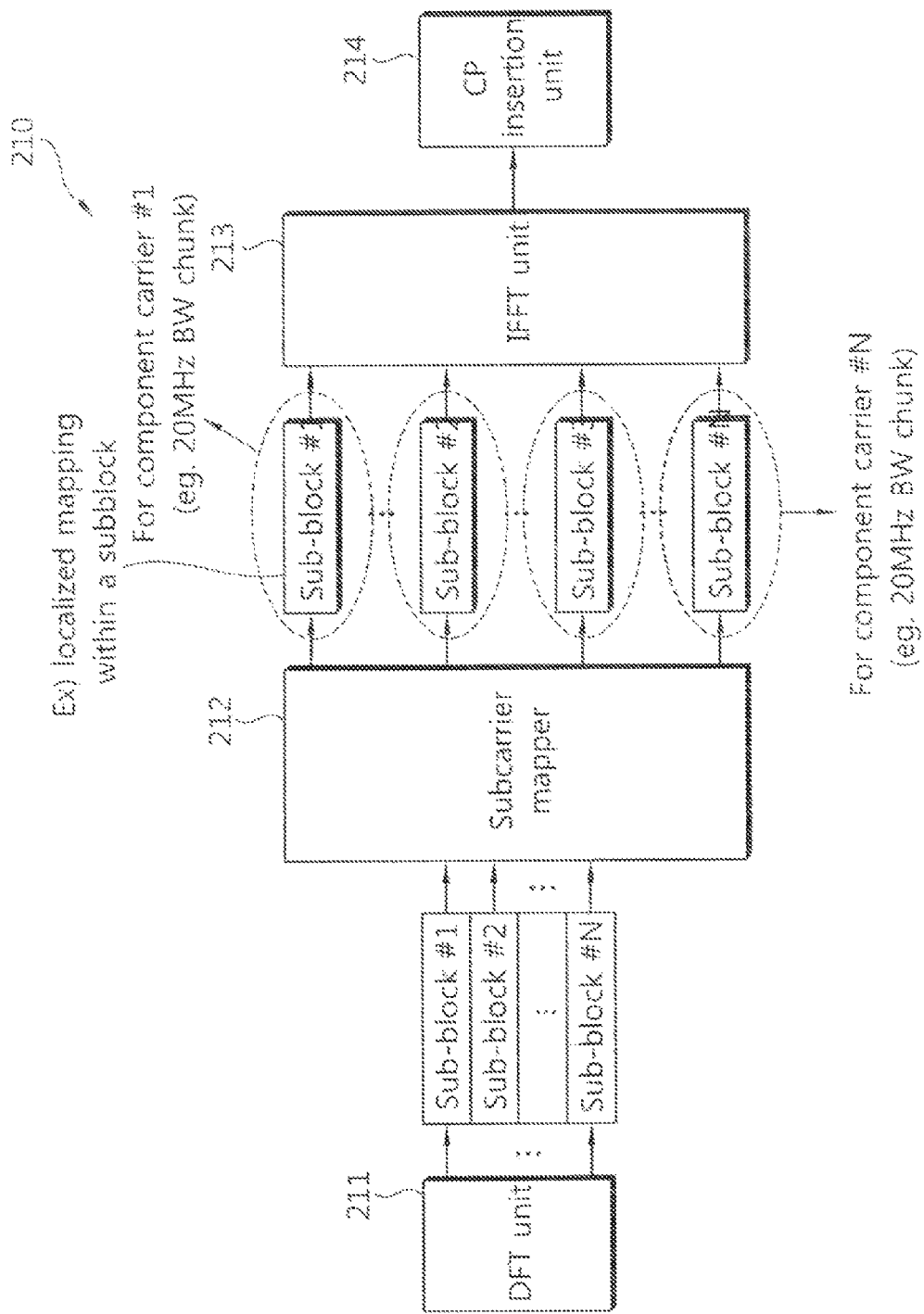
FIG. 16 is a block diagram showing an exemplary structure of a transmitter when clustered SC-FDMA (or clustered DFTs-OFDM) is used for multiple carriers and the multiple carriers are continuously allocated.
Figure 17:
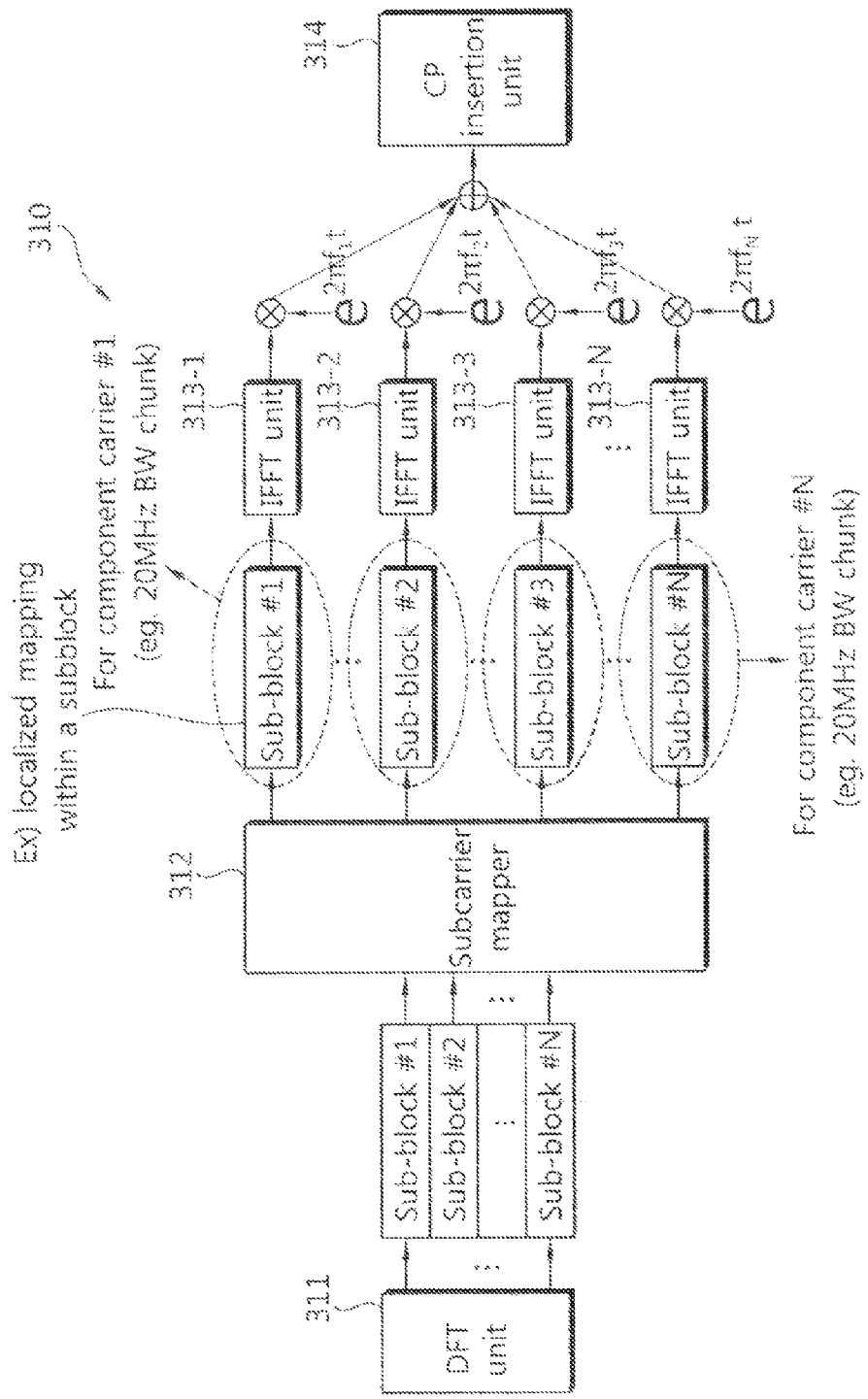
FIG. 17 is a block diagram showing an exemplary structure of a transmitter when clustered SC-FDMA (or clustered DFTs-OFDM) is used for multiple carriers and the multiple carriers are discontinuously allocated.

FIG. 15 is a block diagram showing an exemplary structure of a transmitter when clustered SC-FDMA (or clustered DFTs-OFDM) is used for a single carrier. FIG. 16 is a block diagram showing an exemplary structure of a transmitter when clustered SC-FDMA (or clustered DFTs-OFDM) is used for multiple carriers and the multiple carriers are continuously allocated. FIG. 17 is a block diagram showing an exemplary structure of a transmitter when clustered SC-FDMA (or clustered DFTs-OFDM) is used for multiple carriers and the multiple carriers are discontinuously allocated.

Referring to FIG. 15 and FIG. 16, a transmitter 210 includes a DFT unit 211, a subcarrier mapper 212, an IFFT unit 213, and a CP insertion unit 214.

Complex-valued symbols output from the DFT unit 211 are segmented into N sub-blocks (where N is a natural number). Herein, the N sub-blocks can be represented with a sub-block #1, a sub-block #2, ..., a sub-block #N. The subcarrier mapper 212 maps the N sub-blocks onto subcarriers by distributing the sub-blocks in a frequency domain. NULL can be inserted into every two consecutive sub-blocks. Complex-valued symbols in one sub-block can be mapped to consecutive subcarriers in the frequency domain. That is, localized mapping can be used in one sub-block.

When used in a single carrier as shown in FIG. 15, all of the N sub-blocks correspond to one carrier. On the other hand, when used in multiple carriers as shown in FIG. 16, each of the N sub-blocks may correspond to one carrier. Alternatively, when used in the multiple carriers, a plurality of sub-blocks among the N sub-blocks may correspond to one carrier.

However, in FIG. 16, a time-domain signal is generated by using one IFFT unit. Therefore, in order for the transmitter to be used for multiple carriers, a subcarrier spacing between contiguous carriers has to be aligned in a contiguous carrier allocation situation. When a plurality of carriers allocated to the transmitter are discontinuously allocated, a plurality of IFFT units may need to be included since carriers are not contiguous to each other.

FIG. 17 shows an example of a transmitter that can be used in such a case. Referring to FIG. 17, a transmitter 310 includes a DFT unit 311, a subcarrier mapper 312, a plurality of IFFT units 313-1, 313-2, ..., 313-N, and a CP insertion unit 314 (where N is a natural number). IFFT is individually performed on each of N sub-blocks. An $n^{th}$ IFFT unit 313-$n$ performs IFFT on a sub-block #n to output an $n^{th}$ baseband signal (where n=1, 2, ..., N). The $n^{th}$ baseband signal is multiplied by a signal of an $n^{th}$ carrier signal $f_n$ to generate an $n^{th}$ radio signal. N radio signals generated from the N sub-blocks are added, and thereafter a CP is inserted by the CP insertion unit 314.

Figure 18:
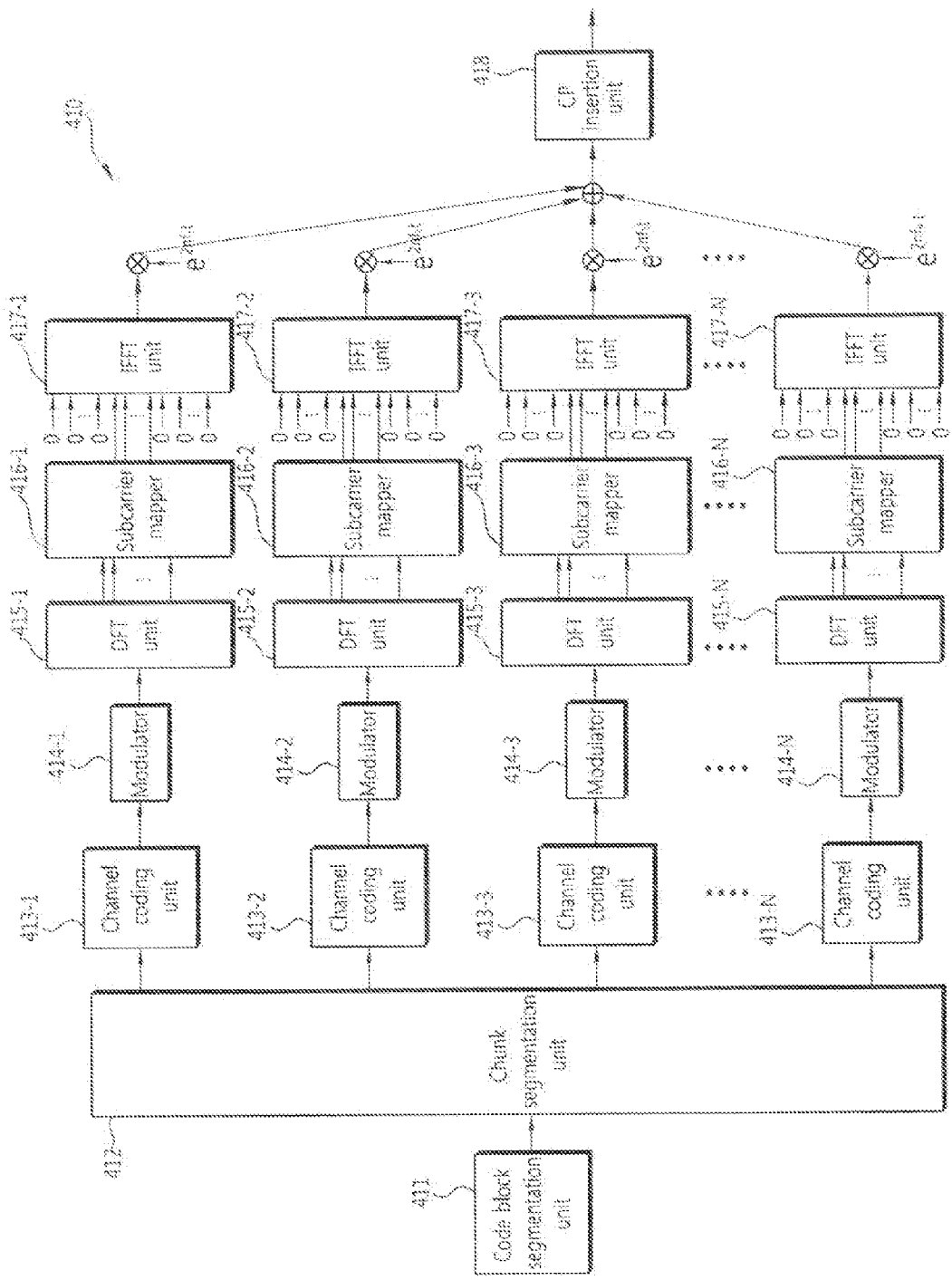
FIG. 18 shows an exemplary structure of a transmitter when using chunk specific DFTs-OFDM.

FIG. 18 shows an exemplary structure of a transmitter when using chunk specific DFTs-OFDM.

Referring to FIG. 18, a transmitter 410 includes a code block segmentation unit 411, a chunk segmentation unit 412, a plurality of channel coding units 413-1, ..., 413-N, a plurality of modulators 414-1, ..., 414-N, a plurality of DFT units 415-1, ..., 415-N, a plurality of subcarrier mappers 416-1, ..., 416-N, a plurality of IFFT units 417-1, ..., 417-N, and a CP insertion unit 418 (where N is a natural number). Herein, N can be the number of multiple carriers used by the transmitter 410.

The code block segmentation unit 411 segments a transport block into a plurality of code blocks. The chunk segmentation unit 412 segments the code block into a plurality of chunks. Herein, the code block can be data transmitted from a multi-carrier transmitter, and the chunk can be a data fragment transmitted by using one carrier among multiple carriers. The transmitter 410 performs DFT in a unit of chunks. The transmitter 410 can be used in both a non-contiguous carrier allocation situation and a contiguous carrier allocation situation. A transmission mechanism in which DFT is performed in a unit of chunks as shown in FIG. 18 is referred to as chunk specific DFTs-OFDM or N×SC-FDMA.

Figure 19:
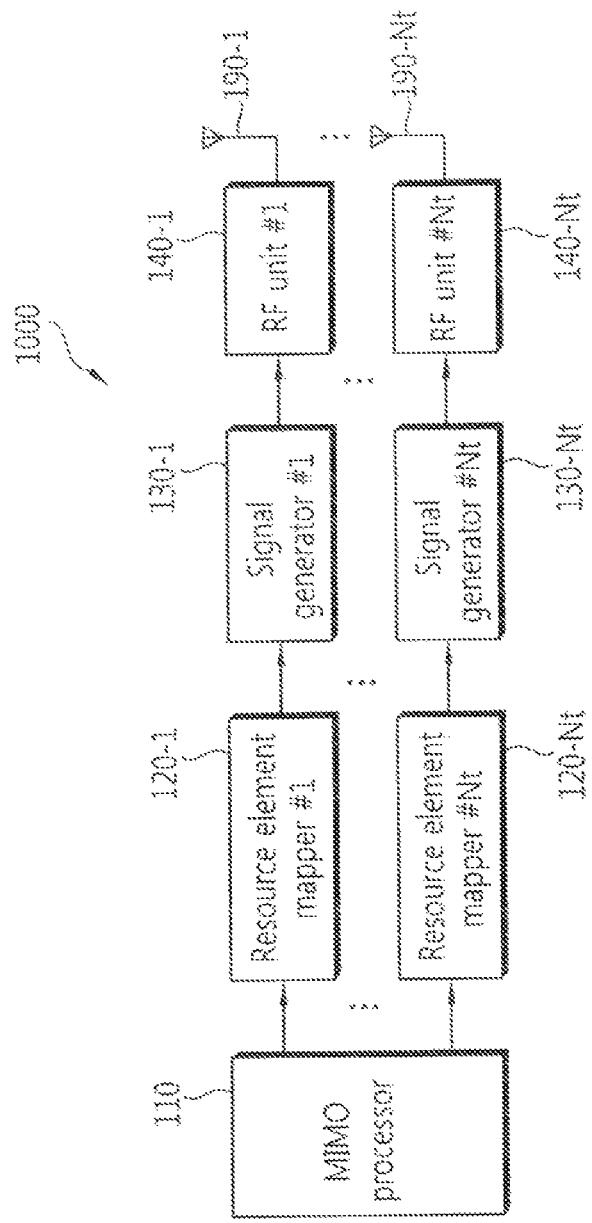
FIG. 19 is a block diagram showing an exemplary structure of a transmitter supporting multi input multi output (MIMO) transmission.

FIG. 19 is a block diagram showing an exemplary structure of a transmitter supporting MIMO transmission. The transmitter may be a part of a UE.

Referring to FIG. 19, a transmitter 1000 includes a MIMO processor, Nt resource element mappers 120-1, ..., 120-Nt, Nt signal generators 130-1, ..., 130-Nt, Nt radio frequency (RF) units 140-1, ..., 140-Nt, and Nt Tx antennas 190-1, ..., 190-Nt (where Nt is a natural number).

The MIMO processor 110 is coupled to each of the Nt resource element mappers 120-1, ..., 120-Nt. The Nt resource element mappers 120-1, ..., 120-Nt are respectively coupled to the Nt signal generators 130-1, ..., 130-Nt. The Nt signal generators 130-1, ..., 130-Nt are respectively coupled to the Nt RF units 140-1, ..., 140-Nt. The Nt RF units 140-1, ..., 140-Nt are respectively coupled to the Nt Tx antennas 190-1, ..., 190-Nt. That is, a resource element mapper #n 120-$n$ is coupled to a signal generator #n 130-$n$, the signal generator #n 130-$n$ is coupled to an RF unit #n 140-$n$, and the RF unit #n 140-$n$ is coupled to a Tx antenna #n 190-$n$ (where n=1, ..., Nt). In case of multiple antenna transmission, one resource grid is defined for each Tx antenna.

Information is input to the MIMO processor 110. The information may be control information or data. The information may have a format of a bit (referred to as an information bit) or a bit-stream (referred to as an information bit stream). The transmitter 1000 can be implemented in a physical layer. In this case, the information may be derived from a higher layer such as a medium access control (MAC) layer.

The MIMO processor 110 is configured to generate Nt Tx streams #1, #2, ..., #Nt from the information. Each of the Nt Tx streams includes a plurality of transmit symbols. The transmit symbol may be a complex-valued symbol obtained by processing the information.

The Nt resource element mappers 120-1, ..., 120-Nt are configured to receive the respective Nt Tx streams. That is, the resource element mapper #n 120-$n$ is configured to receive a Tx stream #n. The resource element mapper #n 120-$n$ is configured to map the Tx stream #n to resource elements in a resource block allocated for information transmission. Each transmit symbol of the Tx stream #n may be mapped to one resource element. '0' may be inserted to a resource element to which the Tx stream #n is not mapped.

One or more resource blocks may be allocated for information transmission. If a plurality of resource blocks are allocated, the plurality of resource blocks may be allocated either continuously or discontinuously.

Each of the Nt signal generators 130-1, ..., 130-Nt is configured to generate a time-continuous OFDM signal, for example, for each SC-FDMA symbol or clustered SC-FDMA symbol. The time-continuous OFDM signal is also referred to as a baseband signal. Each of the Nt signal generators 130-1, ..., 130-Nt may generate an SC-FDMA signal or a clustered SC-FDMA signal by performing discrete Fourier transform (DFT), inverse fast Fourier transform (IFFT), CP insertion, or the like on each symbol. That is, the structure of transmitter as described above referring FIG. 9, FIG. 15~FIG. 18 can be comprised in signal generator.

Each of the Nt RF units 140-1, . . . , 140-Nt converts its OFDM baseband signal into a radio signal. The baseband signal may be converted into the radio signal by performing up-conversion at a carrier frequency. The carrier frequency is also referred to as a center frequency. The transmitter 1000 may use either a single carrier or multiple carriers.

Radio signals are respectively transmitted through the Nt Tx antennas 190-1, . . . , 190-Nt.

Figure 20:
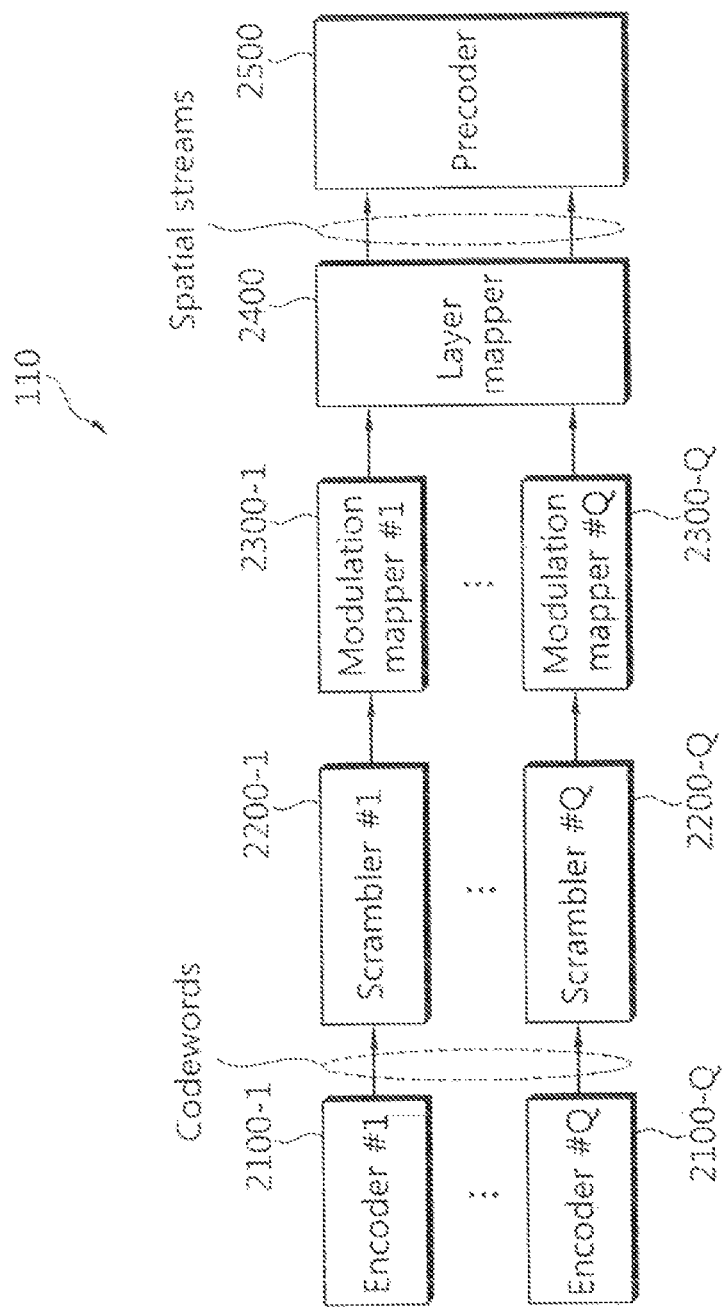
FIG. 20 is a block diagram showing an exemplary structure of a MIMO processor of FIG. 19.

FIG. 20 is a block diagram showing an exemplary structure of the MIMO processor of FIG. 19.

Referring to FIG. 20, the MIMO processor 110 includes Q encoders 2100-1, . . . , 2100-Q, Q scramblers 2200-1, . . . , 2200-Q, Q modulation mappers 2300-1, . . . , 2300-Q, a layer mapper 2400, and a precoder 2500.

The Q encoders 2100-1, . . . , 2100-Q are respectively coupled to the Q scramblers 2200-1, . . . , 2200-Q. The Q scramblers 2200-1, . . . , 2200-Q are respectively coupled to the plurality of modulation mappers 2300-1, . . . , 2300-Q. The plurality of modulation mappers 2300-1, . . . , 2300-Q are coupled to the layer mapper 2400. The layer mapper 240 is coupled to the precoder 2500.

The precoder 2500 is coupled to the Nt resource element mappers. That is, a channel encoder #q 2100-$q$ is coupled to a scrambler #q 2200-$q$, and the scrambler #q 2200-$q$ is coupled to a modulation mapper #q 2300-1 (where q=1, . . . , Q).

Each of the Q encoders 2100-1, . . . , 2100-Q is configured to receive information bit (or information bit stream) and to generate an encoded bit. Each of the Q encoders 2100-1, . . . , 2100-Q performs attaching CRC parity bits, channel coding and rate matching in case the information bit is data bit. For example, each of the Q encoders 2100-1, . . . , 2100-Q inputs data bit and generates encoded bit by performing channel coding on the data bit. The information bit corresponds to information to be transmitted by a transmitter. A size of the information bit may be various according to the information. A size of the encoded bit may also be various according to the size of the information bit and a channel coding scheme. There is no restriction on the channel coding scheme. Examples of the channel coding scheme may include turbo coding, convolution coding, block coding, etc. An encoded bit obtained by performing channel coding on the information bit is referred to as a codeword. Herein, Q denotes the number of codewords. The channel encoder #q 2100-$q$ outputs a codeword #q (where q=1, . . . , Q).

Each of the Q scramblers 2200-1, . . . , 2200-Q is configured to generate a scrambled bit for each codeword. The scrambled bit is generated by scrambling the encoded bit with a scrambling sequence. The scrambler #q 2200-$q$ is configured to generate a scrambled bit for the codeword #q (where q= 1, . . . , Q).

Each of the Q modulation mappers 2300-1, . . . , 2300-Q is configured to generate a modulation symbol for each codeword. The modulation symbol may be complex-valued symbol. The modulation mapper #q 2300-1 is configured to generate a modulation symbol by mapping the scrambled bit for the codeword #q to a symbol for representing a location on a signal constellation (where q=1, . . . , Q). There is no restriction on a modulation scheme. For example, the modulation scheme may be m-phase shift keying (PSK) or m-quadrature amplitude modulation (QAM). The number of modulation symbols output from the modulation mapper #q 2300-1 for the codeword #q may be various according to a size of the scrambled bit and the modulation scheme.

The layer mapper 2400 is configured to map a modulation symbol for each codeword to R spatial layers. The modulation symbol may be mapped to the spatial layers in various manners. R spatial streams are generated as a result. Herein, R denotes a rank. The rank R may be equal to or greater than the number Q of codewords.

The precoder 2500 is configured to generate Nt Tx streams by performing precoding on the R spatial streams. The number Nt of Tx antennas is equal to or less than the rank R.

The Nt Tx streams generated by the precoder 2500 are respectively input to the Nt resource element mappers.

Figure 21:
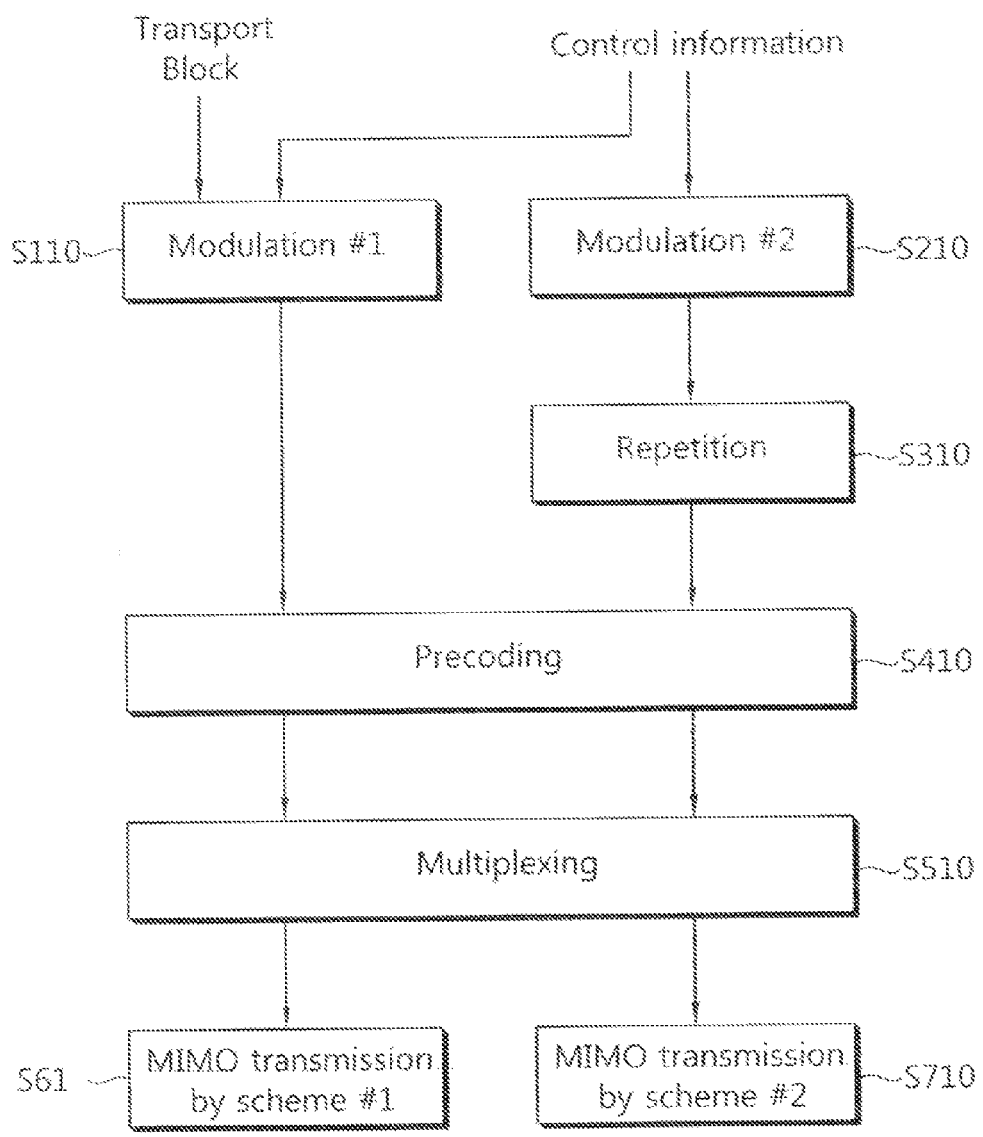
FIG. 21 shows a method of transmitting control information or data in a transmitter.

FIG. 21 shows a method of transmitting control information or data in a transmitter.

Referring to FIG. 21, a modulation #1 can be applied to data, e.g., a transport block (TB), and a modulation #2 can be applied to control information (step S110 and S210). The modulation #1 and the modulation #2 can be performed in the modulation mappers 2300-1, . . . , 2300-Q (But this isn't limited thereto. According to the method of implementation, the modulation can be performed in the encode 2100-1, . . . , 2100-Q). The modulated control information is referred to as a modulation symbol, and a symbol of the modulated TB is referred to as a transport modulation symbol. The TB may include user data transmitted by a UE to a BS in a MAC protocol data unit (PDU) generated in a media access control (MAC) layer, and the control information may be UL control information transmitted by the UE to the BS. Examples of the UL control information include a channel quality indicator (CQI), a recoding matrix indicator (PMI), a hybrid automatic repeat request (HARQ) acknowledgement/not-acknowledgement (ACK/NACK), a rank indication (RI), etc. The CQI provides information on a modulation and coding scheme (MCS) level suitable for a channel. The PMI provides information on a precoding matrix suitable for a channel in codebook based precoding. The PMI may be a simple matrix index in the codebook. Alternatively, the PMI may be channel quantization information, a channel covariance matrix, etc. The RI indicates a rank of the channel.

The ACK/NACK provides information on a success or failure of reception on data transmitted by the BS. The RI is information on the number of layers (i.e., a rank) recommended by the UE. That is, the RI indicates the number of streams that can be used in spatial multiplexing.

As described above, UL control information exists in various types, and transmission reliability may be differently requested according to the type of control information. For example, among the plurality of pieces of control information, the ACK/NACK and the RI may require higher transmission reliability than that of the CQI/PMI. Therefore, the same modulation scheme as that used for data can be used for a specific type of control information (e.g., CQI/PMI), and a modulation scheme having a lower modulation order than that used for data may be used for another type of control information (e.g., ACK/NACK and RI). For example, when 16QAM is used for data, the ACK/NACK and the RI may be modulated by using QPSK.

The modulation symbol generated by modulating the UL control information can be repeated by a rank number (step S310). The repetition of the modulation symbol can be performed by the layer mapper 2400. A UL control information vector consisting of modulation symbols related by the rank number uses the same precoding as that used for data (step S410). Precoding can be performed by the precoder 2500. For convenience of explanation, a symbol obtained after performing precoding on a modulation symbol generated by modulating the UL control information is referred to as a first precoded symbol, and a symbol obtained by performing precoding on a transport modulation block generated by modulating a transport block is referred to as a second precoded symbol.

The first precoded symbol and the second precoded symbol to which precoding is performed are multiplexed to a data region (i.e., a PUSCH region) (step S510). Multiplexing can be performed by the resource element mappers 120-1, ..., 120-Nt.

The multiplexed first and second precoded symbols, i.e., UL control information and data, can be transmitted according to a separate MIMO transmission scheme (step S610 and S710). In this case, the UL control information can be transmitted according to a MIMO transmission scheme different from that used in data transmission irrespective of its type. Or the UL control information can be transmitted according to a different MIMO transmission scheme according to its type. For example, the CQI/PMI can be transmitted according to the same MIMO transmission scheme as that used for data, and the ACK/NACK and the RI can be transmitted according to a MIMO transmission scheme different from that used for data.

Figure 22:
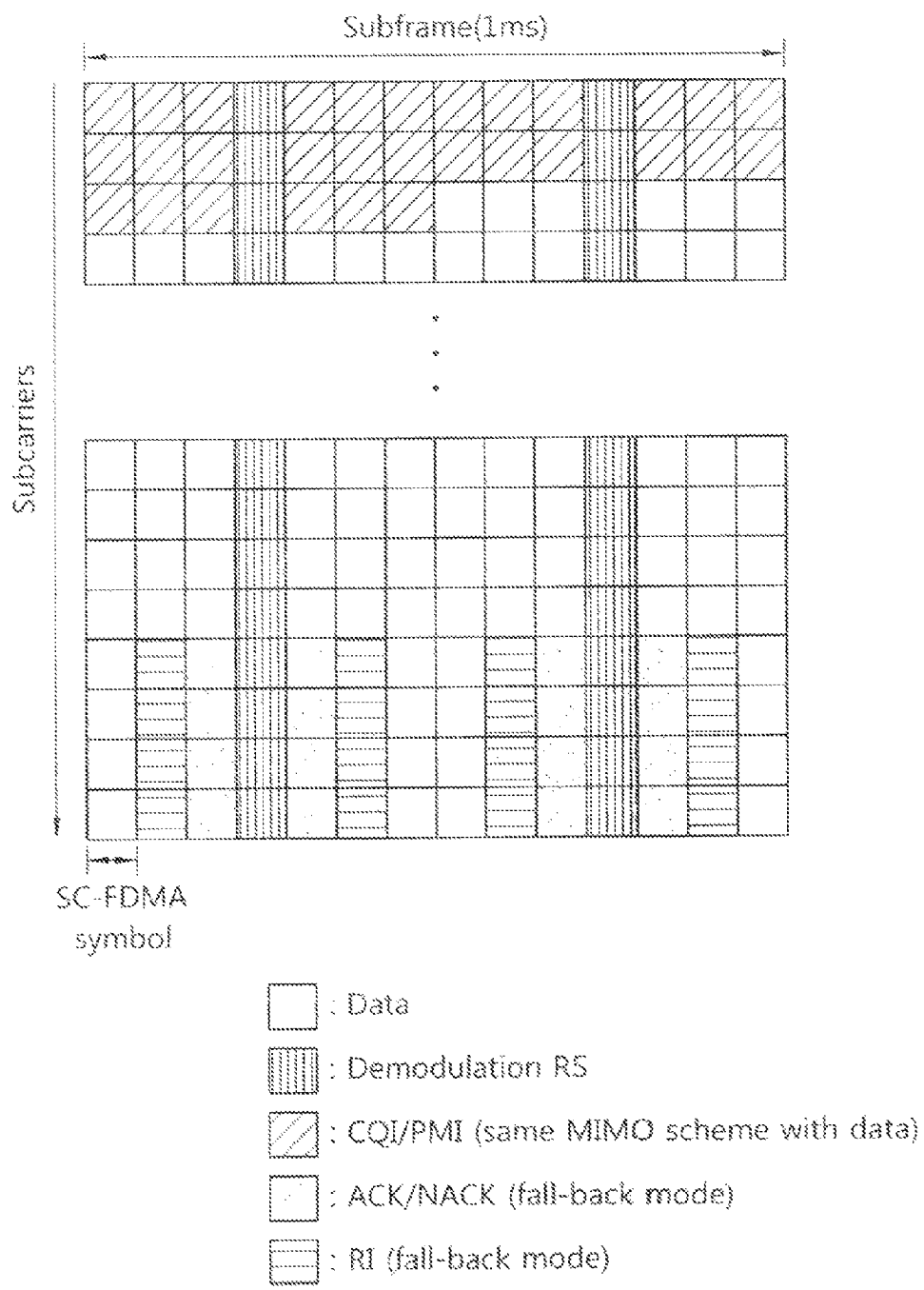
FIG. 22 shows a method of performing multiplexing in a PUSCH region according to a type of control information and an applicable transmission method.

FIG. 22 shows a method of performing multiplexing in a PUSCH region according to a type of control information and an applicable transmission method.

As shown in FIG. 22, control information is allocated to different resource element according to the type of control information. The method of performing multiplexing for control information is same to the method which is described in FIG. 8. As described above (referring FIG. 8), after multiplexing the control information, the entire control information can be transmitted according to a MIMO transmission scheme different from that used in data transmission. Alternatively, the control information can be transmitted by using different MIMO transmission schemes according to the type of control information.

In a backward compatibility aspect, a UE capable of performing MIMO transmission in UL transmission (e.g., a UE operating in 3GPP Release-10, hereafter an LTE-A UE) has to operate also in the legacy system (e.g., a 3GPP Release-8 system) supporting only single antenna transmission in UL transmission.

Alternatively, the LTE-A UE may perform MIMO transmission that is seemingly the same as single antenna transmission in a BS at the request of the BS. That is, the LTE-A UE (which is in a system supporting MIMO transmission) can also perform transmission that is seemingly the same as that used in a legacy system.

As such, when the LTE-A performs MIMO transmission that is seemingly the same as that used in the legacy system, for convenience of explanation, it is referred to as fall-back transmission. In other words, the fall-back transmission may be a transparent MIMO transmission method which is seemingly the same as single antenna transmission from the perspective of a receiver. The fall-back transmission can be implemented by using various types of MIMO transmission schemes such as antenna selection, antenna virtualization, precoding vector switching (PVS), fixed precoding, etc. The fall-back transmission has higher transmission reliability than a case of transmitting a signal by using one antenna. The fall-back transmission can be used in transmission of the entire control information or some types of control information transmitted in a PUSCH region in a piggyback manner. In this case, it may be necessary to define a DM RS allocation method for demodulating control information transmitted in a piggyback manner. For example, it may be necessary to define a method of allocating a DM RS for a $1^{st}$ virtual antenna always used in demodulation of control information transmitted in a piggyback manner.

When a different MIMO transmission scheme is used according to the type of control information, as shown in FIG. 22, the CQI/PMI can be transmitted by using a MIMO transmission scheme which is the same as the MIMO transmission scheme used for data transmission, and the ACK/NACK and the RI can be transmitted by using a MIMO transmission scheme (e.g., the aforementioned fall-back transmission scheme or the transmission diversity scheme) different from the MIMO transmission scheme used for data transmission.

Precoding which is the same as that used in data transmission can be applied to UL control information transmitted in a piggyback manner in the PUSH region.

For example, if s denotes a control symbol, s can be transmitted by using a precoding matrix/vector which is the same as that used in Equation 2 above. That is, s can be expressed by Equation 4.

$$y(i)=HWs(i)+n \qquad \text{[Equation 4]}$$

In Equation 4 above, s(i) denotes a control symbol vector. In this case, transmission reliability can be increased by repeating a control symbol. When the control symbol is repeated in the control symbol vector s(i), the control symbol vector s(i) can have a form in which a control symbol is repeated as shown in Equation 5.

$$s(i)=[s_1(i)s_1(i),\ldots,s_1(i)] \qquad \text{[Equation 5]}$$

As shown in Equation 5, one control symbol may be repeated to increase transmission reliability. The Rx processor 610 can estimate a precoded channel matrix P from an Rx signal vector on the basis of a precoded DM RS. When the precoded channel matrix P is estimated, the receiver 600 can estimate an information stream transmitted in every spatial layer. In case that the control symbol is repeated as many as the number of layers, this procedure can be implemented by various manner. For example, the information bit may be transmitted in each layer repeatedly (i.e. bit level control information repetition) or data symbol may be transmitted in each layer repeatedly (i.e. symbol level control information repetition).

Spatial multiplexing can be applied to the control symbol vector. For example, if a large amount of control information needs to be piggybacked, the BS can request the UE to transmit control information by using the spatial multiplexing. If the UE transmits the control information by using the spatial multiplexing, there is an advantage in that a throughput is increased. When using the spatial multiplexing, a control symbol vector can be expressed by Equation 6.

$$s(i)=[s_1(i)s_2(i),\ldots,s_R(i)] \qquad \text{[Equation 6]}$$

When the spatial multiplexing is used for the control symbol vector, robust channel coding can be applied in comparison with data information in order to ensure transmission reliability.

A control symbol transmitted in a piggyback manner as described above may use a modulation scheme having a lower order than that used in data transmission. For example, if the modulation scheme used in the UL data symbol is {QPSK, 16QAM, 64QAM}, a modulation scheme having a low order such as {QPSK, 16QAM} or {QPSK} can be used for the control symbol. In general, transmission reliability required to the control information is higher than transmission reliability required to data. Therefore, a modulation scheme having a lower modulation order than a modulation scheme used for data is applied to the control information. As such, when a modulation scheme having a low order is used for the control symbol, transmission robust to noise and an interference environment can be achieved.

The UE can transmit the control symbol vector in a hybrid manner. That is, as described above, repetition of the control symbol and multiplexing of the control symbol can be used in combination. For example, if a UL data transmission rank is R, the UE can transmit L control symbols (where L<R) by performing precoding. In this case, the control symbol vector can be expressed by Equation 7.

$$s(i)=[s_1(i)s_1(i),s_2(i),s_3(i),\ldots,s_{R-1}(i)]$$ [Equation 7]

As shown in Equation 7, some of the control symbols, i.e., $S_1(i)$, may be repeated and the remaining symbols $S_2(i)$ to $S_{R-1}(i)$ may be transmitted by performing spatial multiplexing.

Figure 23:
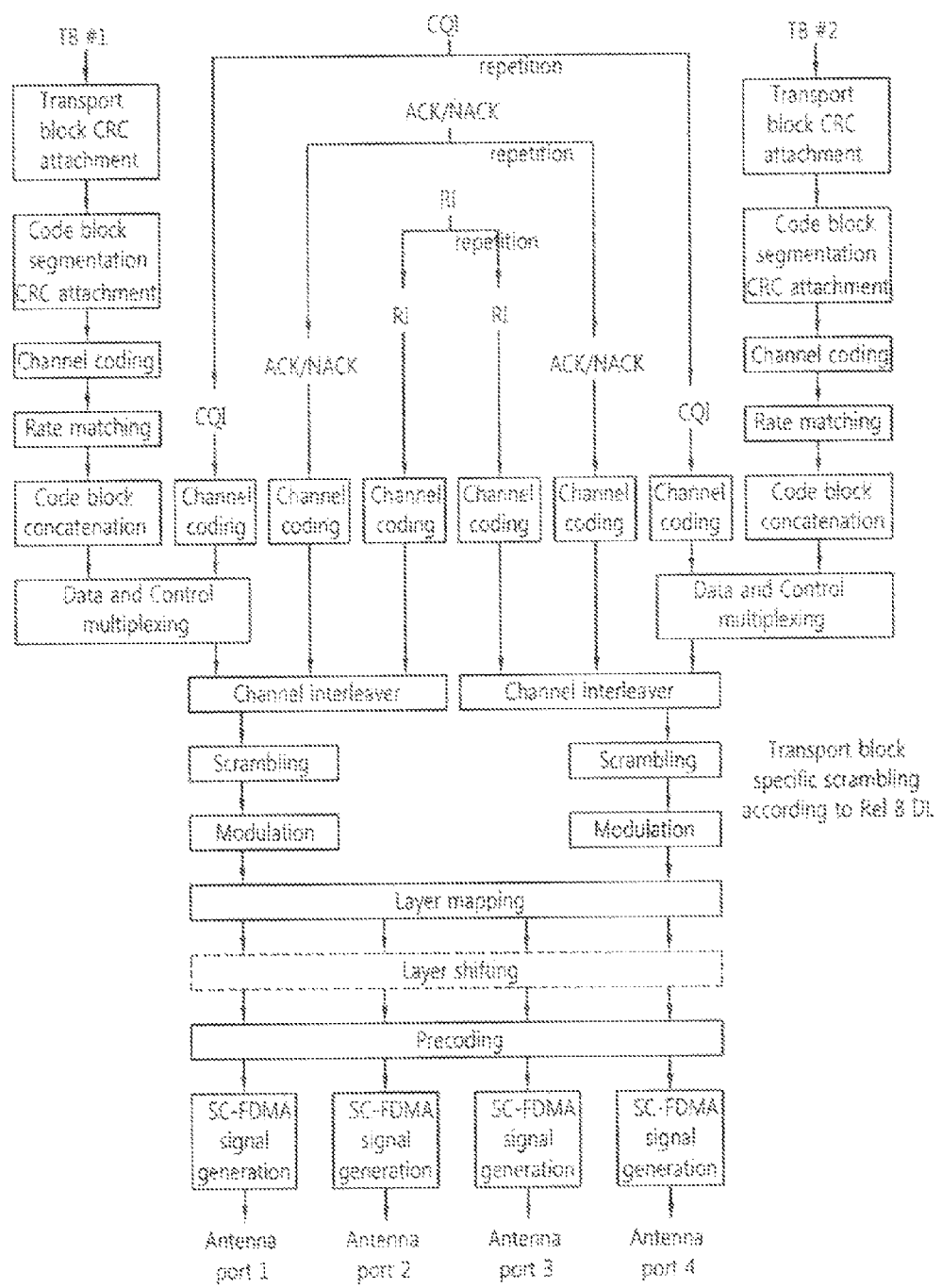
FIG. 23 shows a process of repeating UL control information when the UL control information and UL data are applied with the same precoding and are transmitted by being multiplexed.

FIG. 23 shows a process of repeating UL control information when the UL control information and UL data are applied with the same precoding and are transmitted by being multiplexed.

Referring to FIG. 23, CRC parity bits are attached to a transport block #1 and a transport block #2, and thereafter they are segmented in a unit of code blocks. Then, the CRC parity bits are attached again in a unit of code blocks. Channel coding is performed on a bit sequence after code block segmentation. Encoded bits on which channel coding is performed are subject to rate matching, and then are subject to code block concatenation, thereby generating a data bit sequence. Such a process has already been described above with reference to FIG. 7. FIG. 23 is different from FIG. 7 in that the same control information, i.e., the same control information such as CQI,RI,ACK/NACK, etc., is multiplexed to different transport blocks, i.e., the transport block #1 and the transport block #2. That is, the control information is repeated. The multiplexed UL data and control information are mapped to a radio resource by a channel interleaver (this procedure can be performed by encoder 2100-1, ..., 2100-Q in FIG. 20), and are then subject to scrambling, modulation, layer mapping (optionally, layer shifting), and precoding. As a result, an SC-FDMA signal is generated and is transmitted to each Tx antenna port of a multiple transmission antenna (above-mentioned scrambling, modulation, layer mapping (layer shifting), precoding and SC-FDMA signal generation can be performed by scrambler (2200-1, 2200-Q), modulation mapper (2300-1, ..., 2300-Q), layer mapper (2400), precoder (2500), signal generator (130-1, 130-Nt) respectively).

Although all pieces of control information are repetitively multiplexed in FIG. 23, the present invention is not limited thereto. That is, the control information can be repeated according to a type thereof, or a spatial multiplexing scheme can be applied. In addition, although the control information is repeated before channel coding in FIG. 23, the control information can be repeated after channel coding. That is, a process of inserting the same control information into a different transport block can be applied after scrambling. In this case, the same modulation symbol can be used for the control information.

According to the type of control information and the channel condition, simultaneous transmission of the PUSCH and the PUCCH can be allowed in the same subframe. For example, for the support of improved retransmission, ACK/NACK information can be simultaneously transmitted together with PUSCH transmission in the same subframe by using a PUCCH resource. An RI can be transmitted simultaneously by using the PUCCH resource in a subframe in which the PUSCH is transmitted. However, since a CQI/PMI has a low priority, simultaneous transmission may not be allowed.

Whether to allow simultaneous transmission depending on the type of control information can be variously defined as shown in Table 7 to Table 9. In Table 7 to Table 9, a scheduling request denotes a UL radio resource allocation request signal.

TABLE 7

| | Concurrent PUCCH PUSCH transmission is allowed |
|---|---|
| ACK/NACK | O |
| RI | O |
| Scheduling Request | O |
| CQI/PMI | X |

TABLE 8

| | Concurrent PUCCH PUSCH transmission is allowed |
|---|---|
| ACK/NACK | O |
| RI | X |
| Scheduling Request | O |
| CQI/PMI | X |

TABLE 9

| | Concurrent PUCCH PUSCH transmission is allowed |
|---|---|
| ACK/NACK | O |
| RI | X |
| Scheduling Request | X |
| CQI/PMI | X |

In Table 7 to Table 9 above, 'O' denotes that simultaneous transmission of the PUSCH and the PUCCH is allowed, and 'X' denotes that simultaneous transmission is not allowed.

Hereinafter, a method of transmitting UL control information in a wireless communication system using clustered SC-FDMA will be described.

Figure 24:
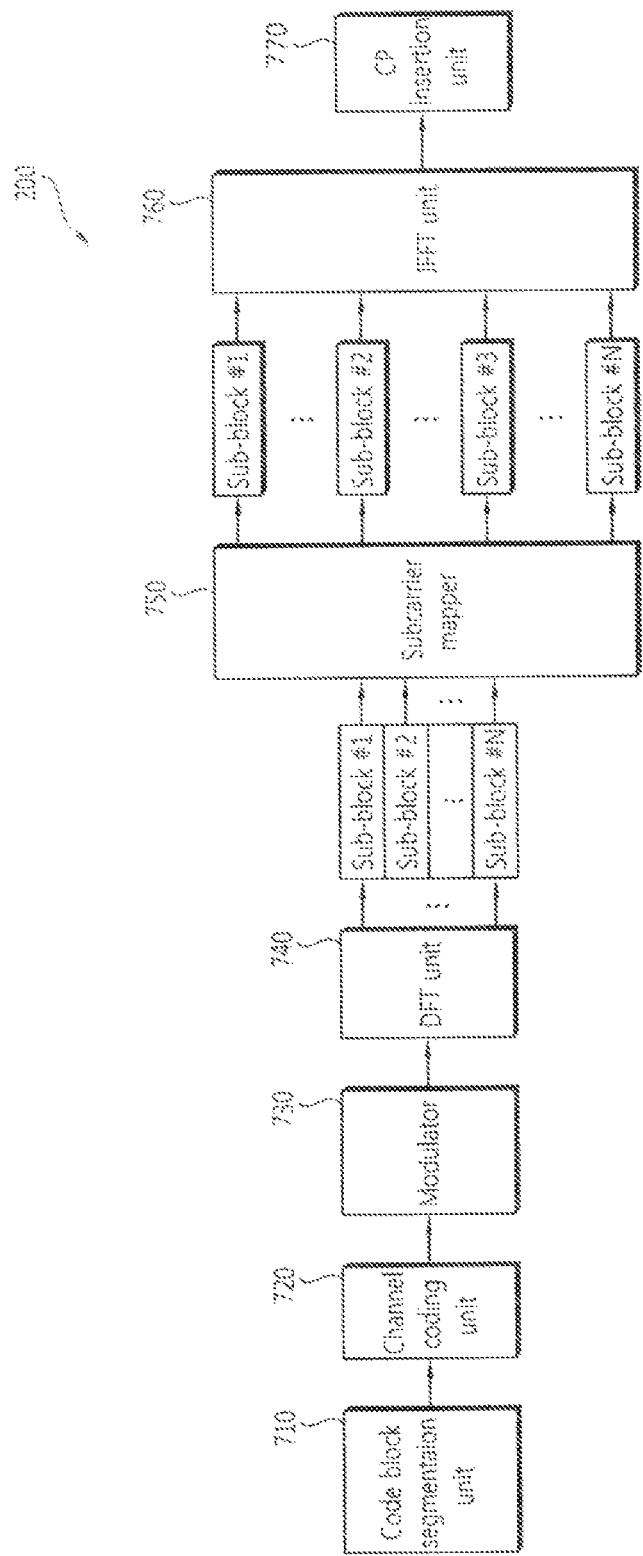
FIG. 24 shows an example of a transmitter operating using clustered SC-FDMA.

FIG. 24 shows an example of a transmitter operating using clustered SC-FDMA. For convenience of explanation, the transmitter operating using clustered SC-FDMA is first described and thereafter the method of transmitting the UL control information is described.

Referring to FIG. 24, a transmitter 200 includes a code block segmentation unit 710, a channel coding unit 720, a modulator 730, a DFT unit 740, a subcarrier mapper 750, an IFFT unit 760, and a CP insertion unit 770.

The code block segmentation unit 710 segments a transport block (TB) into code blocks. The channel coding unit 720 performs channel coding. The modulator 730 modulates data and control information by using various methods.

Complex-valued symbols output from the DFT unit 740 are segmented into N sub-blocks (where N is a natural number). Herein, N can be represented as a sub-block #1, a sub-block #2, ..., a sub-block #N. The subcarrier mapper 750 spreads the N sub-blocks in a frequency domain and then maps them to subcarriers. NULL can be inserted between every two consecutive sub-blocks. The complex-valued symbols in one sub-block can be mapped to consecutive subcarriers in the frequency domain. That is, a localized mapping scheme can be used in one subframe.

The IFFT unit 760 performs IFFT on the N sub-blocks, and thereafter the CP insertion unit 770 inserts a CP.

A mechanism of FIG. 24 in which symbols output from the DFT unit are processed by being segmented into a plurality of sub-blocks is referred to as clustered SC-FDMA. The SC-FDMA allocates consecutive resources in the frequency domain in PUSCH transmission in order to avoid increase of a peak-to-average power ratio (PAPR). However, the clustered SC-FDMA is capable of performing discontinuous resource allocation to obtain a scheduling gain. In this case, a method of piggybacking the control information in the PUSCH has to be taken into account.

Figure 25:
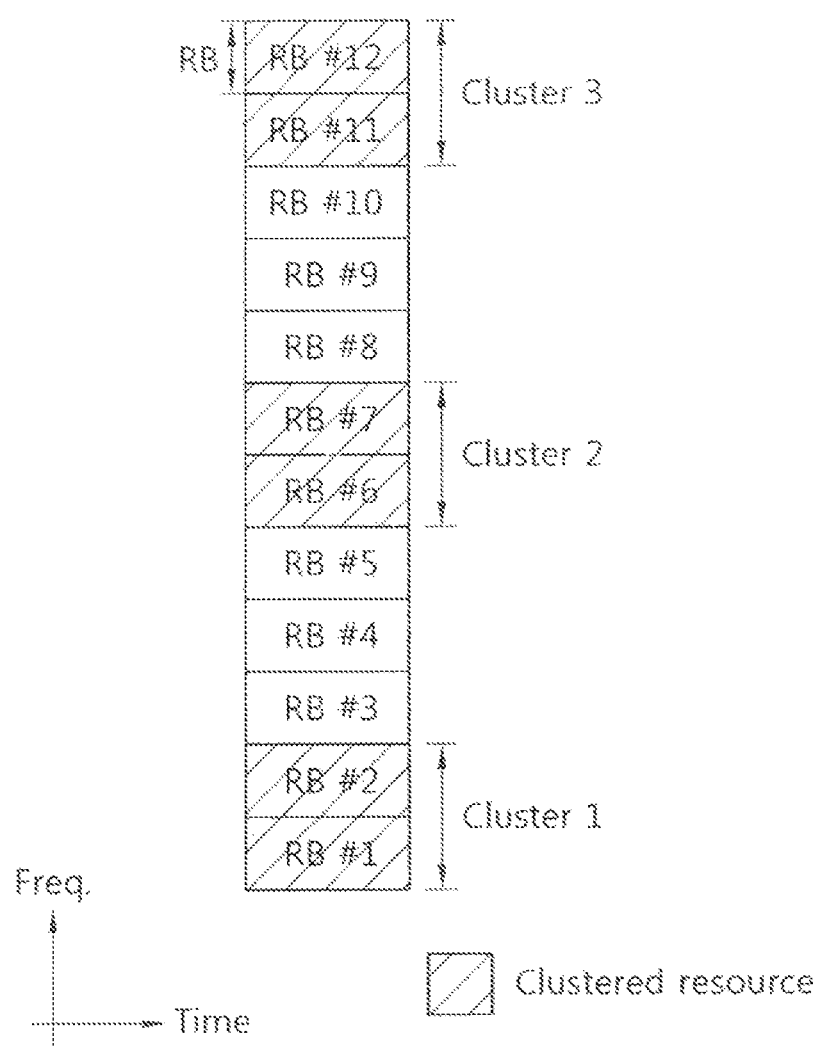
FIG. 25 shows a method of transmitting control information in a piggyback manner when PUSCH transmission is performed by using N clustered resources in a transmitter operating using clustered SC-FDMA.

FIG. 25 shows a method of transmitting control information in a piggyback manner when PUSCH transmission is performed by using N clustered resources in a transmitter operating using clustered SC-FDMA.

Assume that N clusters are used in PUSCH transmission, where N is 3 in FIG. 25. Then, the control information can be piggybacked by using any one of the following methods.

1. Piggyback using a primary cluster: The primary cluster may be first defined by using a higher layer signal. When piggyback transmission of the control information is requested, the primary cluster is used only for piggyback. The primary cluster can be fixed as a first cluster among the N clusters. Herein, the first cluster may be a cluster having a lowest frequency index in the frequency domain. In FIG. 25, the primary cluster may be a cluster 1, and in this case, the control information can be piggybacked by using the cluster 1.

2. Piggyback using a selected cluster: When a BS requests piggyback transmission of control information, the BS can indicate to a UE a cluster that can be used for control information piggyback. This method can indicate a selected cluster by considering a channel condition among the N clusters, and thus there is an advantage in that channel selective transmission is possible.

3. Piggyback using all clusters: The clusters can be treated as if they are physically discontinuously deployed or logically continuously deployed. When all clusters are treated as a virtually continuous resource block, the conventional method (e.g., 3GPP rel.8) can be reused.

4. Piggyback in a cluster group: L clusters are configured as one group, and the configured group can be used for control information piggyback. For example, in FIG. 25, clusters 1 and 2 can be configured as one group and the group can be used to transmit the control information in a piggyback manner by using this group.

Figure 26:
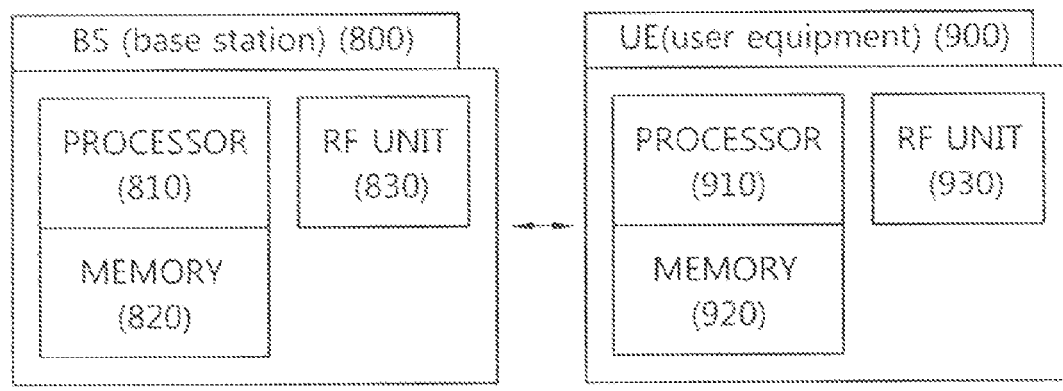
FIG. 26 is a block diagram showing a structure of a base station and a user equipment.

FIG. 26 is a block diagram showing a structure of a BS and a UE.

A BS 800 includes a processor 810, a memory 820, and a radio frequency (RF) unit 830. The processor 810 implements the proposed functions, processes, and/or methods. The aforementioned functions of the receiver can be implemented by the processor 810. The memory 820 is coupled to the processor 810, and stores a variety of information for driving the processor 810. The RF unit 830 is coupled to the processor 810, and transmits and/or receives a radio signal.

A UE 900 includes a processor 910, a memory 920, and an RF unit 930. The processor 910 configures a subframe which includes a plurality of symbols in a time domain, and includes a control region (i.e., a PUCCH region) on which only control information can be transmitted and a data region (i.e., a PUSCH region) on which UL control information and data can be transmitted together in a frequency domain. Further, the processor 910 transmits the UL control information and data to the BS in the PUSCH region of the subframe. In this case, the UL control information can be transmitted through a plurality of Tx antennas. As described above, the UL control information uses a MIMO transmission scheme used in data transmission or another MIMO transmission according to a type of the control information. In addition, the UL control information can be transmitted after applying precoding which is the same as that used in data transmission. In addition, regarding the UL control information, the same control information may be repeated by a rank number or may be transmitted by being multiplexed with different pieces of control information. The aforementioned functions of the transmitters 100 and 200 can be implemented by the processor 910. Further, layers of radio interface protocols can be implemented by the processor 910. The memory 920 is coupled to the processor 910, and stores a variety of information for driving the processor 910. The RF unit 930 is coupled to the processor 910, and transmits and/or receives a radio signal.

The processors 810 and 910 may include an application-specific integrated circuit (ASIC), a separate chipset, a logic circuit, a data processing unit, and/or a converter for mutually converting a baseband signal and a radio signal. The memories 820 and 920 may include a read-only memory (ROM), a random access memory (RAM), a flash memory, a memory card, a storage medium, and/or other equivalent storage devices. The RF units 830 and 930 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 820 and 920 and may be performed by the processors 810 and 910. The memories 820 and 920 may be located inside or outside the processors 810 and 910, and may be coupled to the processors 810 and 910 by using various well-known means.

According to the present invention, a user equipment can repetitively transmit uplink control information depending on a channel state between the user equipment and a base station. Therefore, even if the channel state is not good, an uplink control signal can be reliably transmitted.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for transmitting control information of a user equipment in a physical uplink shared channel (PUSCH) over which control information and data can be transmitted in an uplink subframe comprising the PUSCH and a physical uplink control channel (PUCCH) over which only control information can be transmitted, the method comprising:
    generating data;
    generating uplink control information (UCI) repeatedly as many times as a number of uplink data transmission layers of the data;
    multiplexing the data and the repeatedly generated UCI at the PUSCH; and
    transmitting the data and the repeatedly generated UCI in the uplink subframe.

2. The method of claim 1, wherein the uplink subframe comprises a plurality of single carrier-frequency division multiple access (SC-FDMA) symbols in a time domain and a reference signal is allocated to two SC-FDMA symbols among the plurality of SC-FDMA symbols in the PUSCH.

3. The method of claim 2, wherein the UCI comprises at least an acknowledgement/not-acknowledgement (ACK/NACK) or a rank indicator (RI).

4. The method of claim 3, wherein the ACK/NACK is allocated to SC-FDMA symbols which are adjacent to the two SC-FDMA symbols to which the reference signal is allocated and the RI is allocated to SC-FDMA symbols which are adjacent to the SC-FDMA symbols to which the ACK/NACK is allocated.

5. The method of claim 1, wherein when the uplink subframe comprises 14 SC-FDMA symbols, a reference signal is allocated to the $4^{th}$ and $11^{th}$ SC-FDMA symbols among the 14 SC-FDMA symbols.

6. A user equipment (UE), transmitting control information in a physical uplink shared channel (PUSCH) over which control information and data can be transmitted in a uplink subframe comprising the PUSCH and a physical uplink control channel (PUCCH) over which only control information can be transmitted, the UE comprising:
   a radio frequency (RF) unit configured for transmitting and receiving a radio signal; and
   a processor coupled to the RF unit,
   wherein the processor is configured for:
   generating data;
   generating uplink control information (UCI) repeatedly as many times as a number of uplink data transmission layers of the data;
   multiplexing the data and the repeatedly generated UCI at the PUSCH; and
   transmitting the data and the repeatedly generated UCI in the uplink subframe.

7. The UE of claim 6, wherein the uplink subframe comprises a plurality of single carrier-frequency division multiple access (SC-FDMA) symbols in a time domain and a reference signal is allocated to two SC-FDMA symbols among the plurality of SC-FDMA symbols in the PUSCH.

8. The UE of claim 7, wherein the UCI comprises at least an acknowledgement/not-acknowledgement (ACK/NACK) or a rank indicator (RI).

9. The UE of claim 8, wherein the ACK/NACK is allocated to SC-FDMA symbols which are adjacent to the two SC-FDMA symbols to which the reference signal is allocated and the RI is allocated to SC-FDMA symbols which are adjacent to the SC-FDMA symbols to which the ACK/NACK is allocated.

10. The UE of claim 6, wherein when the uplink subframe comprises 14 SC-FDMA symbols, a reference signal is allocated to the $4^{th}$ and $11^{th}$ SC-FDMA symbols among the 14 SC-FDMA symbols.

* * * * *